(12) United States Patent
Maeda et al.

(10) Patent No.: US 7,644,202 B2
(45) Date of Patent: *Jan. 5, 2010

(54) DISK ARRAY DEVICE AND METHOD FOR CONTROLLING DISK ARRAY DEVICE

(75) Inventors: Masami Maeda, Odawara (JP); Hisao Homma, Odawara (JP); Hidetoshi Sakaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 11/508,242

(22) Filed: Aug. 23, 2006

(65) Prior Publication Data

US 2006/0288163 A1    Dec. 21, 2006

Related U.S. Application Data

(63) Continuation of application No. 10/791,479, filed on Mar. 2, 2004, now Pat. No. 7,117,276.

(30) Foreign Application Priority Data

Nov. 28, 2003    (JP)    ............................... 2003-400514

(51) Int. Cl.
    *G06F 13/20*    (2006.01)
(52) U.S. Cl. ........................... 710/36; 710/74; 711/114
(58) Field of Classification Search ........................ None
    See application file for complete search history.

(56) References Cited

U.S. PATENT DOCUMENTS

| | | | |
|---|---|---|---|
| 5,375,227 A | 12/1994 | Akatsu et al. | |
| 5,860,137 A | 1/1999 | Raz et al. | |
| 6,012,151 A | 1/2000 | Mano | |
| 6,484,173 B1 | 11/2002 | O'Hare et al. | |
| 6,606,695 B2 | 8/2003 | Kamano et al. | |
| 6,654,902 B1 | 11/2003 | Brunelle et al. | |
| 6,745,281 B1 | 6/2004 | Saegusa | |
| 6,772,306 B2 | 8/2004 | Suzuki et al. | |
| 6,850,997 B1 | 2/2005 | Rooney et al. ................ 710/38 |
| 6,877,044 B2 | 4/2005 | Lo et al. ....................... 710/2 |
| 2001/0020254 A1 | 9/2001 | Blumenau et al. | |
| 2002/0062429 A1 | 5/2002 | Tsuboki et al. | |

(Continued)

FOREIGN PATENT DOCUMENTS

JP    8171533    7/1996

(Continued)

*Primary Examiner*—Gary Portka
(74) *Attorney, Agent, or Firm*—Brundidge & Stanger, P.C.

(57) ABSTRACT

A disk array device includes at least one channel control section for receiving data input/output requests from an information processing device, at least one disk control section for sending data input/output requests to hard disk drives based on the data input/output requests received by the channel control section, and a shared memory for the channel control section and the disk control section to read and write data. Information concerning ports that are actually used by the user is stored in a port control table in the shared memory, and the channel control section refers to the port control table and controls whether to make each port available for use by deciding whether to respond to a primitive sequence in a link initialization received from the information processing device regarding each of the plurality of ports.

24 Claims, 28 Drawing Sheets

U.S. PATENT DOCUMENTS

| | | |
|---|---|---|
| 2002/0178336 A1 | 11/2002 | Fujimoto et al. |
| 2003/0110355 A1 | 6/2003 | Fujimoto et al. |
| 2003/0131192 A1 | 7/2003 | Nakamura et al. |
| 2004/0025052 A1 | 2/2004 | Dickenson ................ 713/201 |
| 2004/0034737 A1 | 2/2004 | Fujimoto et al. |
| 2004/0054866 A1 | 3/2004 | Blumenau et al. |
| 2004/0078517 A1 | 4/2004 | Kaneko et al. |
| 2004/0111560 A1 | 6/2004 | Takase et al. |
| 2004/0153721 A1 | 8/2004 | Fujimoto |
| 2004/0158673 A1 | 8/2004 | Matsunami et al. |
| 2004/0172510 A1 | 9/2004 | Nagashima et al. |
| 2004/0194106 A1 | 9/2004 | Ogawa ....................... 718/100 |
| 2004/0249929 A1 | 12/2004 | Goodman |
| 2005/0102448 A1 | 5/2005 | Doshi et al. .................. 710/36 |

FOREIGN PATENT DOCUMENTS

| | | |
|---|---|---|
| JP | 2002 236852 | 8/2002 |

FIG. 12

```
PORT CONTROL TABLE
┌─────────────────────────────┐
│ NUMBER OF PORTS             │
│ AVAILABLE FOR USE           │
├─────────────────────────────┤
│ NUMBER OF PORTS IN USE      │
├─────────────────────────────┤
│ PORT CONNECTION             │
│ INFORMATION                 │
```

| Port#00 | Port#01 |
|---------|---------|
| Port#02 | Port#03 |
| . | . |
| Port#N-1 | Port#N |

PORT CONTROL TABLE — 1501

NUMBER OF PORT GROUPS AVAILABLE FOR USE

NUMBER OF PORT GROUPS IN USE

PORT CONNECTION INFORMATION

| Port#00 | Port#01 |
|---|---|
| Port#02 | Port#03 |
| . | . |
| Port#N-1 | Port#N |

PORT GROUP CONNECTION INFORMATION

| P/K No#0-1 | P/K No#0-2 |
|---|---|
| P/K No#1-1 | P/K No#1-2 |
| . | . |
| P/K No#N-1 | P/K No#N-2 |

FIG. 17

| PORT CONTROL TABLE | | | | | |
|---|---|---|---|---|---|
| NUMBER OF LOGICAL PATHS AVAILABEL FOR USE | | | | | |
| NUMBER OF LOGICAL PATHS IN USE | | | | | |
| LOGICAL PATH INFORMATION | | | | | |
| LOGICAL PATH # | CONTROL FLG | CHL PORT # | DCK PORT # | CHL Img # | CU Img # |
| 000 | 1 | 1C | 10 | 02 | 03 |
| 001 | 1 | 08 | 20 | 03 | 03 |
| 002 | 0 | 08 | 20 | 03 | 02 |
| . | . | . | . | . | . |
| NNN | 0 | 0 | 0 | 0 | 0 |

PORT CONTROL TABLE

TIME TABLE FOR PORTS AVAILABLE FOR USE

| No | TIME ZONE | NUMBER OF PORTS |
|---|---|---|
| 1 | 9:00~17:00 | 4 |
| 2 | 17:00~9:00 | 8 |
| N | | |

~ 2501

NUMBER OF PORTS IN USE

PORT CONNECTION INFORMATION

| Port#00 : 14.0h | Port#01 : 14.0h |
|---|---|
| Port#02 : 24.0h | Port#03 : 24.0h |
| · | · |
| Port#N-1 : 14.0h | Port#N : 14.0h |

TOTAL PORT USAGE TIME " 96.0 h

FIG. 27

PERFORMANCE MONITORING TABLE

MEASUREMENT TIME INTERVAL ~ 2701

PORT USAAGE RATE THRESHOLD

PORT INFORMATION (USAGE RATE)

| Port#00 | Port#01 |
|---------|---------|
| Port#02 | Port#03 |
| . | . |
| Port#N-1 | Port#N |

DISK ARRAY DEVICE AND METHOD FOR CONTROLLING DISK ARRAY DEVICE

CROSS-REFERENCE TO RELATED APPLICATION

The present application is a continuation of application Ser. No. 10/791,479, filed Mar. 2, 2004, now U.S. Pat. No. 7,117,276; which claims priority from Japanese patent application No. 2003-400514, filed Nov. 28, 2003, the contents of which are incorporated herein by reference.

BACKGROUND OF THE INVENTION

1. Field of the Invention

The present invention relates to a disk array device and a method for controlling the disk array device.

2. Description of the Related Arts

When a disk array device is installed, a user must assume installation costs based on the configuration of the device, as well as operational costs based on usage after the disk array device is installed. In this connection, according to a conventional technology, the number of accesses and data transfer volume for each port may be measured and the measurement data may be stored after a disk array device is installed, and operational costs may be charged based on the measurement data.

Even when a user does not need the use of all of a plurality of ports provided on a disk array device, the user must still assume the installation costs based on all of the ports provided on the disk array device. In view of this situation, there is a demand to make available for use only the number of ports that a user actually needs and to make it possible to install a disk array device whose cost is based on the number of ports. The conventional technology describes a metered charging method based on the data transfer volume of each port after a disk array device is installed, but such a method does not provide installation costs based on the number of ports that the user actually needs at the time the disk array device is installed.

SUMMARY OF THE INVENTION

In accordance with an embodiment of the present invention, a disk array device includes a plurality of hard disk drives; a plurality of ports connected to at least one information processing device via cables; at least one channel control section that receives a data input/output request from the information processing device to the hard disk drives; at least one disk control section that is communicatably connected to the plurality of hard disk drives and that sends a data input/output request to the hard disk drives based on the data input/output request to the hard disk drives that is received by the channel control section; and a shared memory that is accessible by the channel control section and the disk control section to read and write data, wherein the shared memory stores a port control table that sets control information indicating whether the plurality of ports are permitted for use, and the channel control section refers to the control information set in the port control table and determines whether to respond to a connection request received from the information processing device regarding the ports.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 12 shows an example of a port control table for controlling ports based on the number of ports according to the present embodiment.

FIG. 15 shows an example of a port control table for controlling ports based on the number of port groups according to the present embodiment.

FIG. 17 shows an example of a port control table for controlling ports based on the number of logical paths according to the present embodiment.

FIG. 25 shows an example of a port control table for changing the number of ports available for use depending on the time period according to the present embodiment.

FIG. 27 shows an example of a performance monitoring table according to the present embodiment.

DESCRIPTION OF PREFERRED EMBODIMENTS

[Overall Configuration of Disk Array Device]

Figure 1:
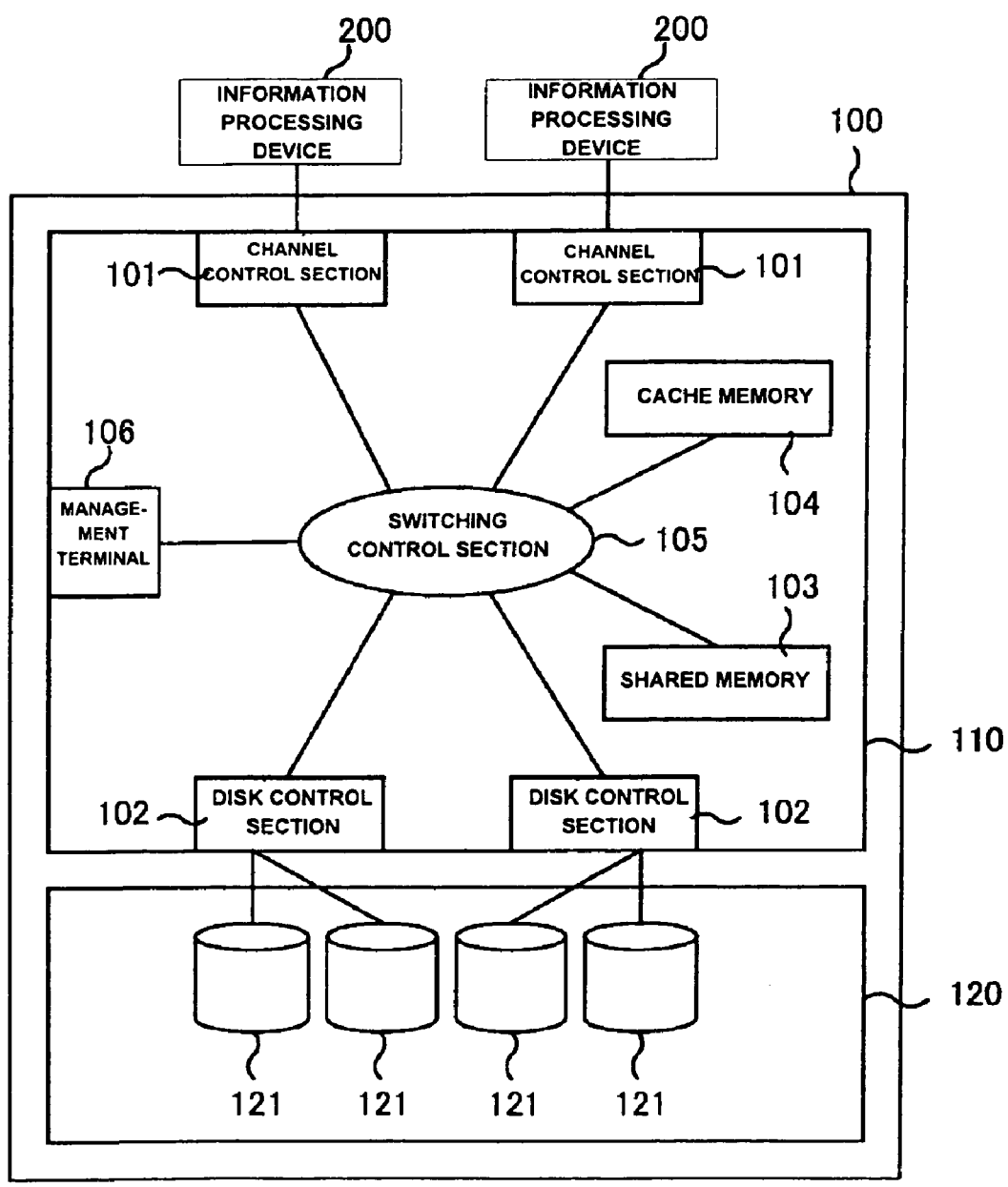
FIG. 1 schematically shows a block diagram of the overall configuration of a disk array device in accordance with an embodiment of the present invention.

FIG. 1 schematically shows a block diagram of the overall configuration of a disk array device 100 in accordance with an embodiment of the present invention.

The disk array device 100 includes at least one disk control device 110 and at least one disk drive device 120. The disk array device 100 is connected to at least one information processing device 200 through a communications device. The communications device can be, for example, LAN (Local Area Network), SAN (Storage Area Network), iSCSI (Internet Small Computer System Interface), ESCON (Enterprise Systems Connection®), or FICON (Fibre Connection®).

The information processing device 200 may be a computer with a CPU (central processing unit) and memory; the information processing device 200 can be a personal computer, workstation or mainframe. The information processing device 200 can be comprised of a plurality of computers that are linked to one another. An operating system operates on each information processing device 200, and application software operates on the operating system. The application software provides, for example, automatic deposit/payment system functions for banks or seat reservation system functions for airlines.

The disk control device 110 governs the entire control of the disk array device 100. The disk drive device 120 is provided with a plurality of hard disk drives 121 that store data. The disk control device 110 performs controls on the hard disk drives 121 based on commands received from the information processing device 200. For example, upon receiving a data input/output request from the information processing device 200, the disk control device 110 performs an input/output processing of data stored on the hard disk drives 121.

The disk control device 110 comprises at least one channel control section 101, at least one disk control section 102, a shared memory 103, a cache memory 104, a switching control section 105 that includes crossbar switches for communicatably connecting these components and sections described, and a management terminal 106.

The cache memory 104 is used primarily for temporarily storing data that are transferred between the channel control section 101 and the disk control section 102. For example, if a data input/output command that the channel control section 101 receives from the information processing device 200 is a write command, the channel control section 101 writes the write data received from the information processing device 200 in the cache memory 104. The disk control section 102 reads the write data from the cache memory 104 and writes the data on the hard disk drives 121.

The disk control section 102 reads data input/output requests written in the shared memory 103 by the channel control section 101 and executes data read or write processing to or from the hard disk drives 121 according to commands (e.g., SCSI commands) set in the data input/output requests. The disk control section 102 writes in the cache memory 104 the data read from the hard disk drives 121. In addition, the disk control section 102 sends data write completion notices and read completion notices to the channel control section 101. The disk control section 102 may be provided with functions for controlling the hard disk drives 121 in RAID (Redundant Array of Inexpensive Disks) levels (e.g., 0, 1, 5) established according to the RAID method.

Storage areas provided by the hard disk drives 121 are managed in units of logical volumes, which are volumes logically established in the storage areas. Reading and writing data to and from the hard disk drives 121 can be performed by designating identifiers assigned to logical volumes.

The management terminal 106 is a computer for maintaining and managing the disk array device 100. Changes to parameters and/or software executed by the channel control section 101 or the disk control section 102 are made according to instructions from the management terminal 106. The management terminal 106 can be built in inside the disk array device 100 or can be separate.

Besides the configuration described above, the disk array device 100 may be structured that it can function as an NAS (Network Attached Storage) that can accept data input/output requests based on filename designations from the information processing device 200 in accordance with NFS (Network File System) protocol, for example.

The shared memory 103 can be accessed by the channel control section 101, the disk control section 102 and the management terminal 106. In addition to being used for transfer of data input/output request commands between the channel control section 101 and the disk control section 102, the shared memory 103 also stores management information of the disk array device 100. According to the present embodiment, a port control table, described later, is stored in the shared memory 103.

[Exterior Configuration of Disk Array Device]

Figure 2:
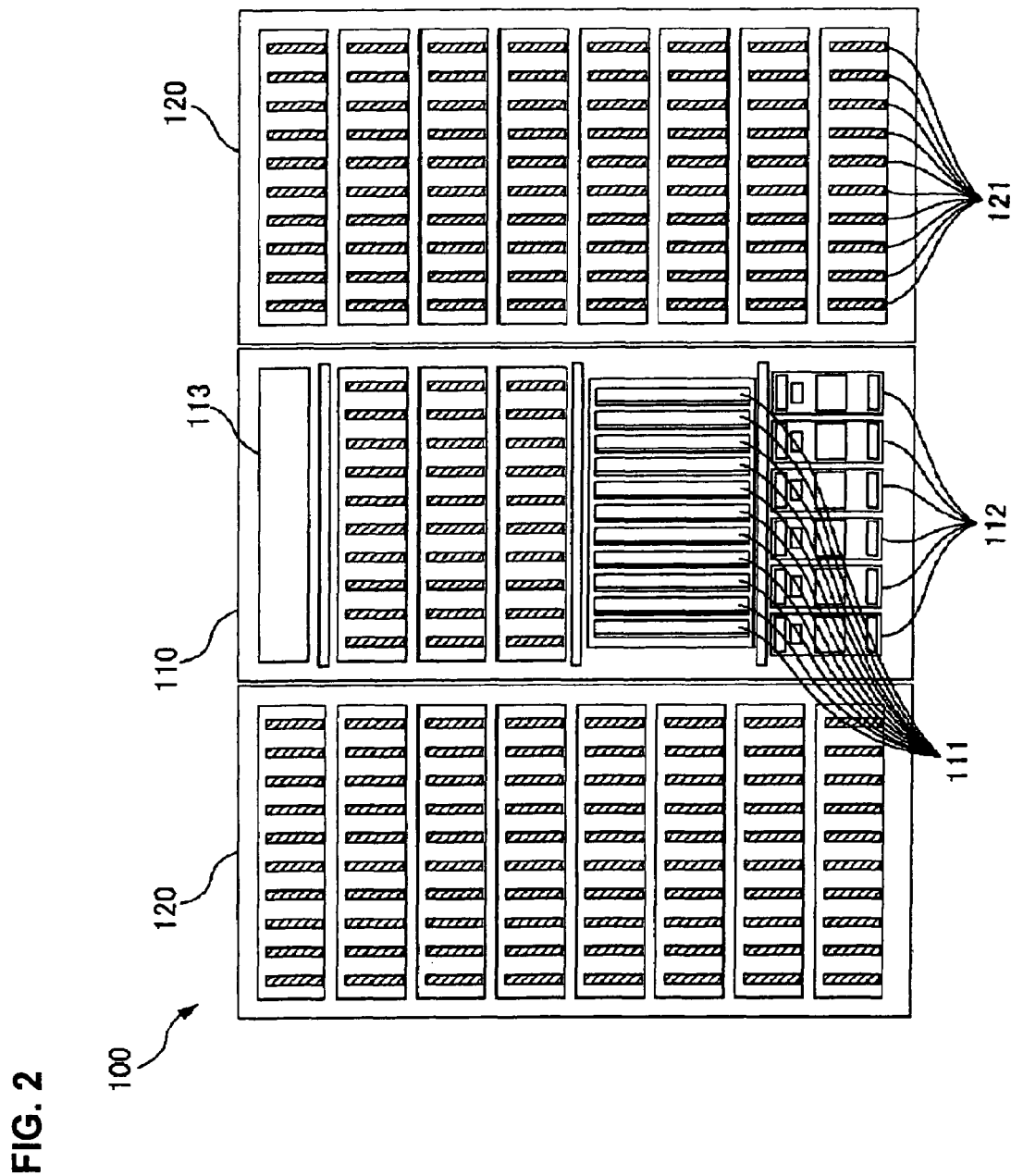
FIG. 2 is a view of the exterior configuration of the disk array device according to the present embodiment.

FIG. 2 shows an exterior configuration of the disk array device 100 according to the present embodiment. In the disk array device 100 shown in FIG. 2, the disk control device 110 is placed in the center, while the disk drive device 120 is placed on either side of the disk control device 110. The disk drives 121 can also be contained in the disk control device 110.

The disk control device 110 comprises at least one controller 111 (a plurality of controllers in the embodiment shown in FIG. 2), a fan 113, and at least one power source section 112. Each controller 111 may be formed from a substrate having the channel control section 101, the disk control section 102, the shared memory 103, the cache memory 104 and/or the switching control section 105 mounted thereon. By providing the controller 111 on the disk control device 110, the disk array device 100 can perform its controls. The fan 113 serves to cool the disk control device 110. The power source section 112 serves to supply power to the disk control device 110.

The disk drive device 120 contains numerous disk drives 121. Each disk drive 121 may be detachably contained in a housing that comprises each disk drive device 120.

Figure 3:
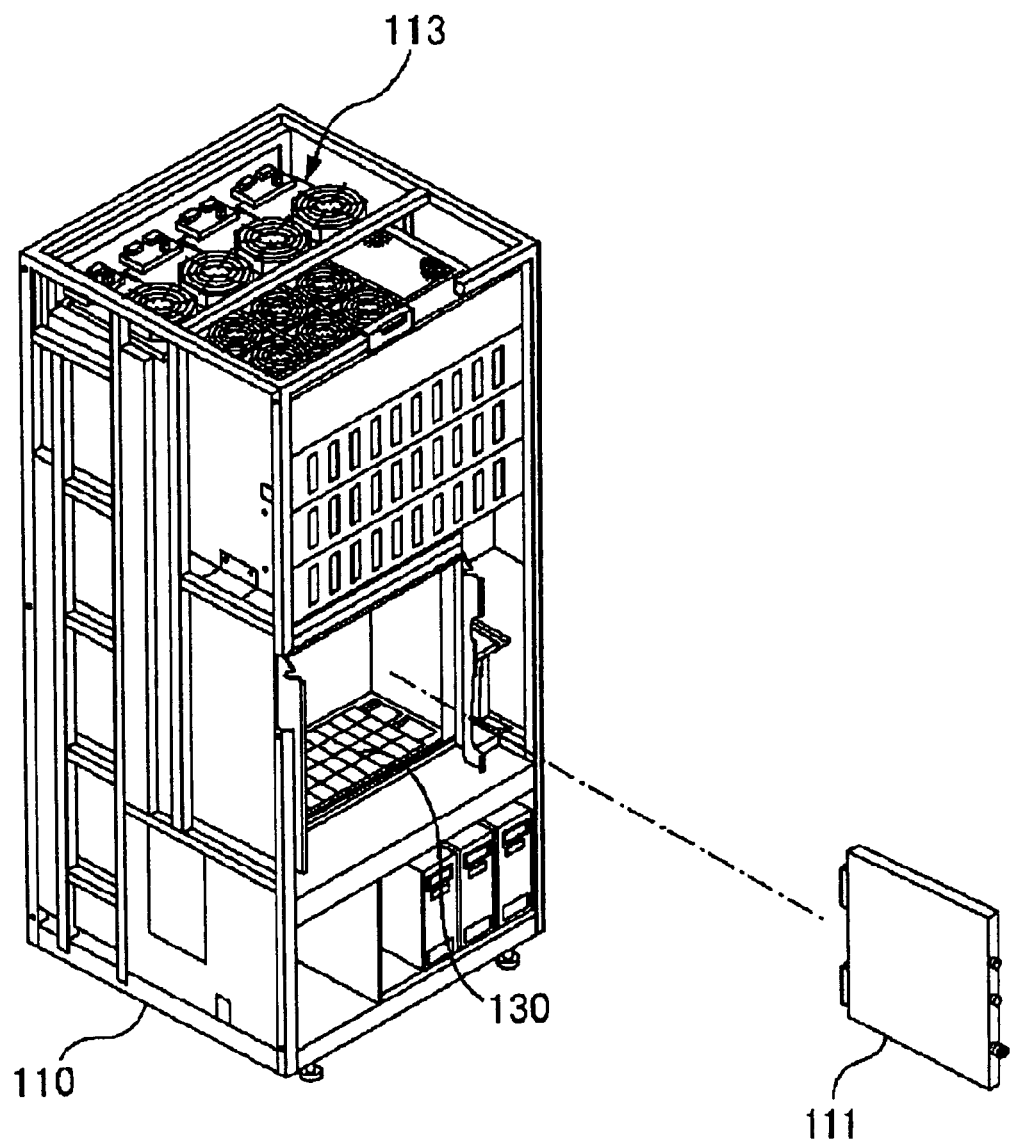
FIG. 3 is a perspective view of a disk control device according to the present embodiment in a state in which controllers are inserted into mounting sections of the disk control device.

FIG. 3 shows a state in which the controller 111 is inserted into a mounting section 130 of the disk control device 110. The mounting section 130 is provided with a plurality of slots, and each slot is provided with guide rails for mounting the controller 111. By inserting the controller 111 into a slot along the guide rails, the controller 111 can be mounted on the disk control device 110. The controller 111 mounted on the slot can be removed by pulling it out along the guide rails. The controller 111 is provided with a connector for electrically connecting the controller 111 with the disk control device 110. The connector fits in a partner connector (e.g., receptacle) provided on a rear-end front-facing section of the mounting section 130 of the disk control device 110.

[Configuration of Channel Control Section]

Figure 4:
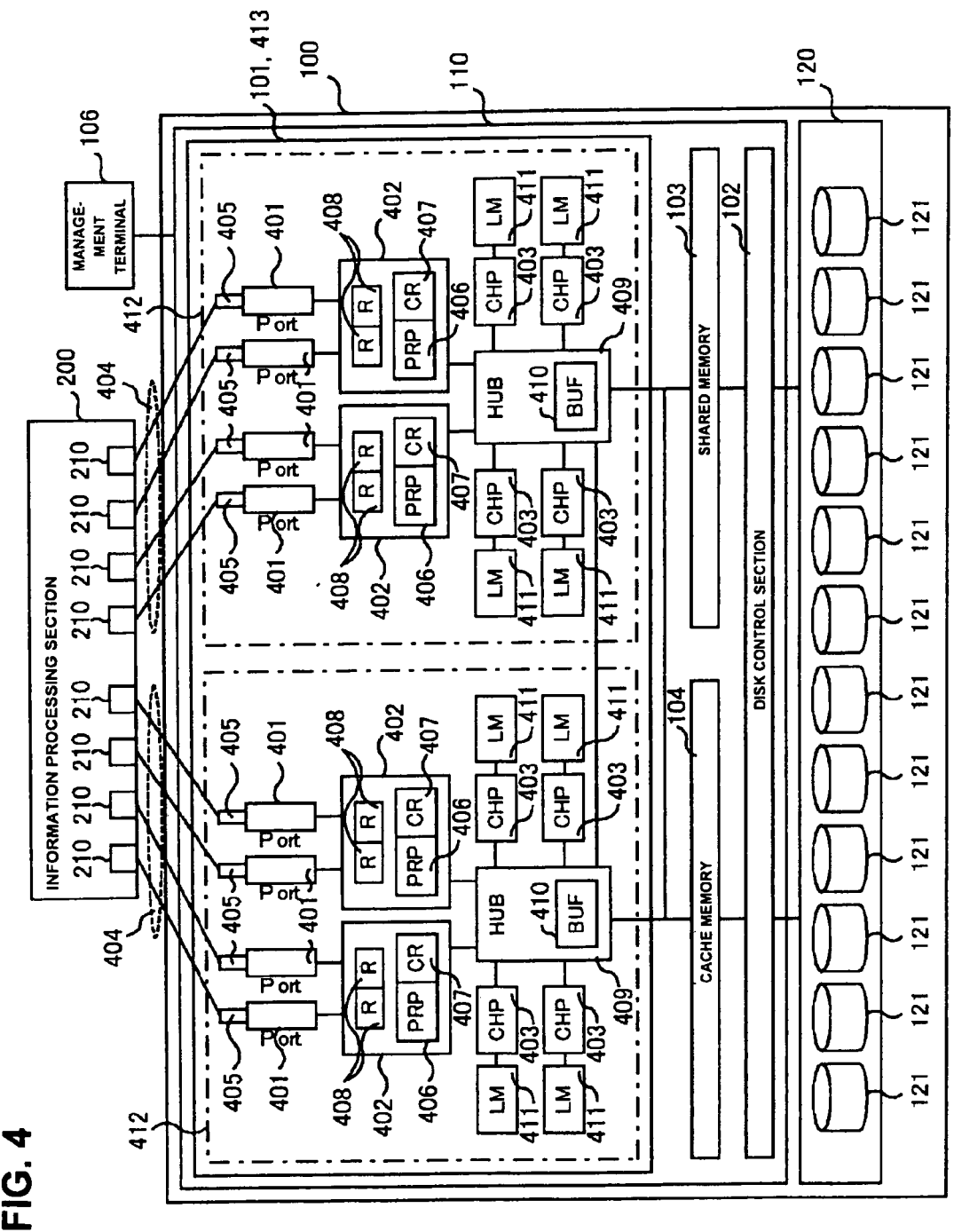
FIG. 4 schematically shows a block diagram of the configuration of channel control sections according to the present embodiment.

FIG. 4 is a block diagram of the configuration of the channel control section 101 according to the present embodiment. The channel control section 101 includes at least one port 401, at least one protocol control section 402 and at least one channel processor 403.

The port 401 is communicatably connected to a port 210 of the information processing device 200 via a fiber channel cable 404. If the fiber channel cable 404 is an optical fiber, a port plug 405 is connected to the port 401. The port plug 405 can change the wavelengths of optical fibers. There are two types of fiber channel cables, a singlemode fiber and a multimode fiber, and each has a different wavelength. For this reason, by changing the port plug 405 depending on the fiber channel cable type, the port 401 can communicate with the port 210 regardless of the fiber channel cable type.

The protocol control section 402 governs the control of the corresponding port 401. The protocol control section 402 is provided with a protocol processor 406, a control register 407 for controlling processing by the protocol processor 406, and send/receive registers 408 for temporarily storing data sent and received to and from the port 401. The protocol processor 406 is a CPU and controls the port 401 by executing microprograms stored in memory.

The channel processor 403 is a CPU and controls the entire channel control section 101 by executing microprograms stored in memory. The channel processor 403 is communicatably connected to the shared memory 103, the cache memory 104, and the protocol control section 402 via a hub 409. The hub 409 is provided with a communications buffer 410 that temporarily stores data that are sent/received. The channel processor 403 is connected to a local memory 411, which is used for temporarily storing data that the channel processor 403 reads from the shared memory 103.

In the channel control section 101, there is formed at least one port group 412 consisting of a plurality of ports 401. Furthermore, in the channel control section 101, there is formed at least one package 413 that includes a plurality of ports 401, and one package 413 is mounted on one controller 111. It is possible for two or more packages 413 of the channel control section 101 to be mounted on the disk array device 100. With this, if a failure occurs on one of the packages 413, another package 413 can be used, which would improve the fault tolerance of the disk array device 100.

[Link Initialization]

Figure 5:
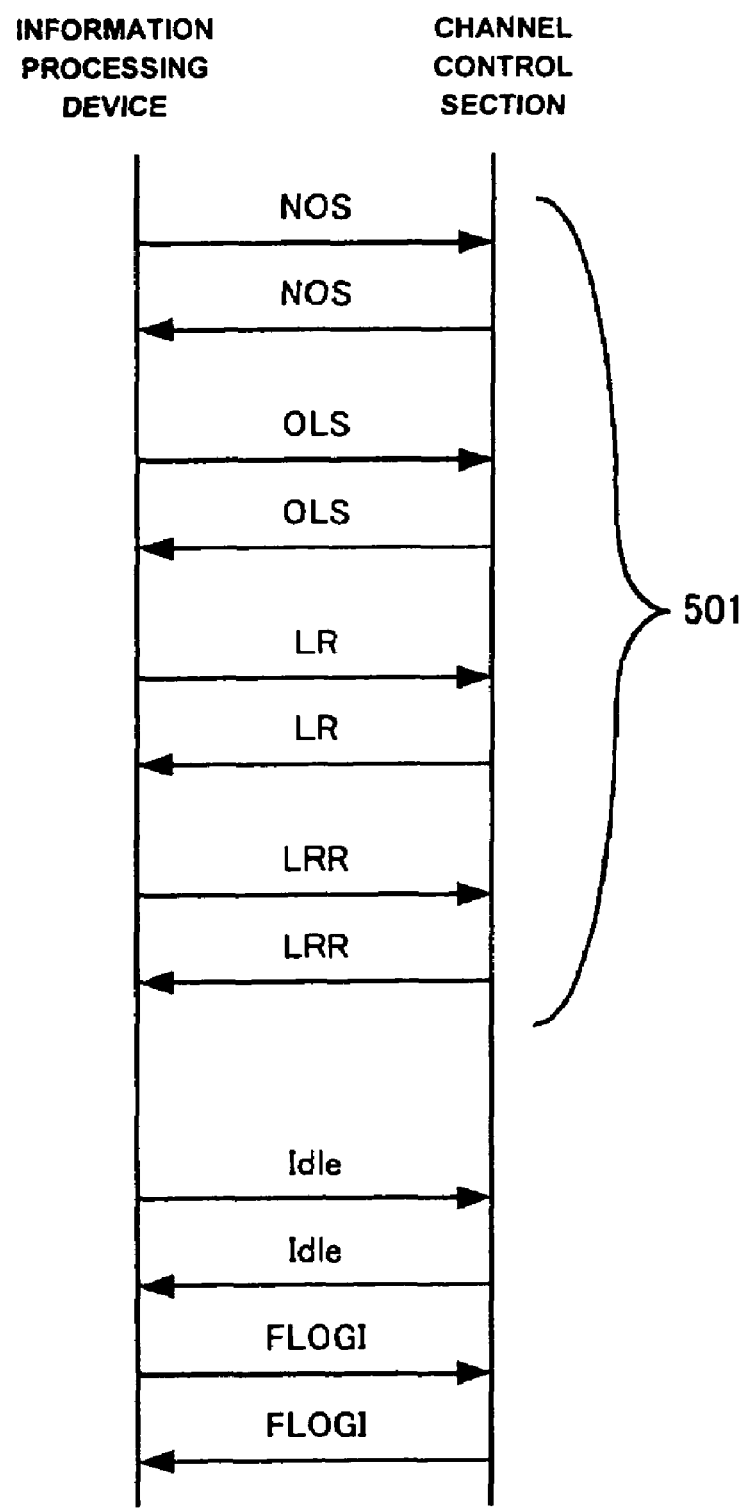
FIG. 5 shows a series of data exchanged including a primitive sequence that is sent and received between an information processing device and a channel control section, in a link initialization processing according to the present embodiment.

FIG. 5 is a diagram indicating a series of procedures, including a primitive sequence 501, that are sent and received, in a processing for initializing a physical link between the port 210 of the information processing device 200 and the corresponding port 401 of the channel control section 101. When the fiber channel cable 404 is connected to the port 401, the protocol processor 406 detects NOS (Not_Operational Primitive Sequence) sent from the information processing device 200. The protocol processor 406 sends the NOS to the information processing device 200 via the port 401. Next, OLS (Off line Primitive Sequence), LR (Link Reset Primitive Sequence), and LRR (Link Reset Response Primitive Sequence) are sent and received between the information processing device 200 and the channel control section 101. This establishes a physical link between the port 210 of the information processing device 200 and the port 401 of the channel control section 101. Once the physical link is established, a primitive signal Idle, which indicates that preparations for sending and receiving frames are in place, is transferred and FLOGI (Fabric Log In) frames for participating in fiber channel fabric are sent and received. This completes the initialization of the physical link.

When the fiber channel cable 404 is pulled out (i.e., removed) from the port 401 of the channel control section 101, the protocol processor 406 detects Loss of Signal from the port 401.

[Logical Path]

After the physical link is initialized, a logical path that is used when the information processing device 200 accesses the disk array device 100 is established.

Figure 6:
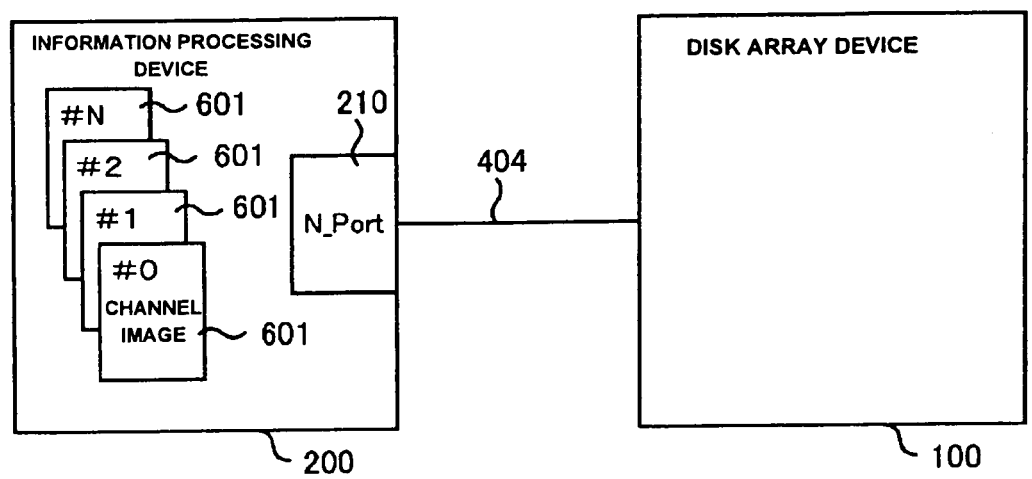
FIG. 6 shows a diagram of channel images provided on the information processing device according to the present embodiment.

FIG. 6 is a diagram showing channel images 601, which are provided on the information processing device 200. The channel images 601 refer to logical information processing devices, and each channel image 601 appears as an independent information processing device from the disk array device 100. A plurality of channel images 601 are connected to the disk array device 100 via one port 210.

Figure 7:
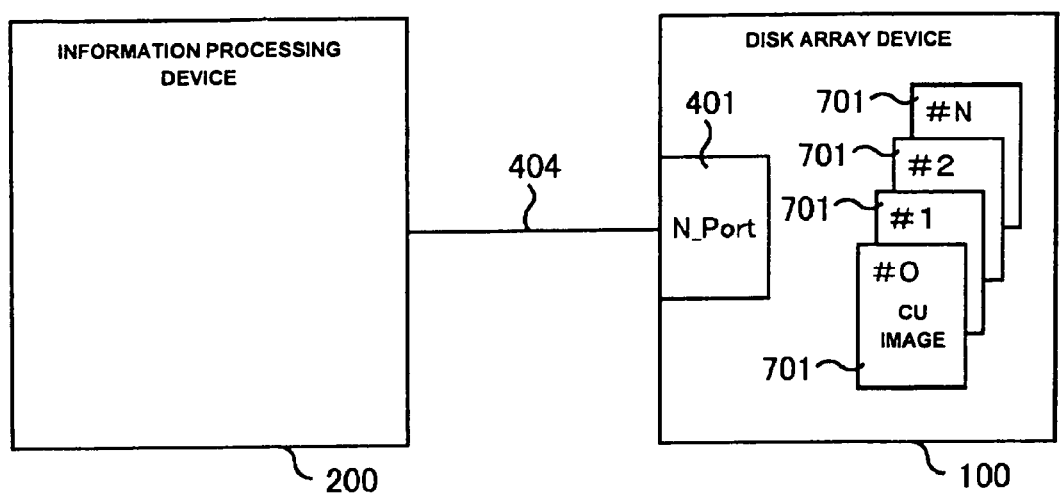
FIG. 7 shows a diagram of CU images provided on the disk array device according to the present embodiment.

FIG. 7 is a diagram of CU (Control Unit) images 701, which are provided on the disk array device 100. The CU images 701 refer to logical disk array devices, and each CU image 701 appears as an independent disk array device from the information processing device 200. Each of the ports 401 of the disk array device 100 is shared by a plurality of CU images 701.

In order to have data sent and received between the channel images 601 and the CU images 701, a route for communications between the channel images 601 and the CU images 701 must be established. This route is called a logical path. The logical path is defined based on the combination of the channel images 601, the port 210 of the information processing device 200, the port 401 of the disk array device 100, and the CU images 701.

Figure 8:
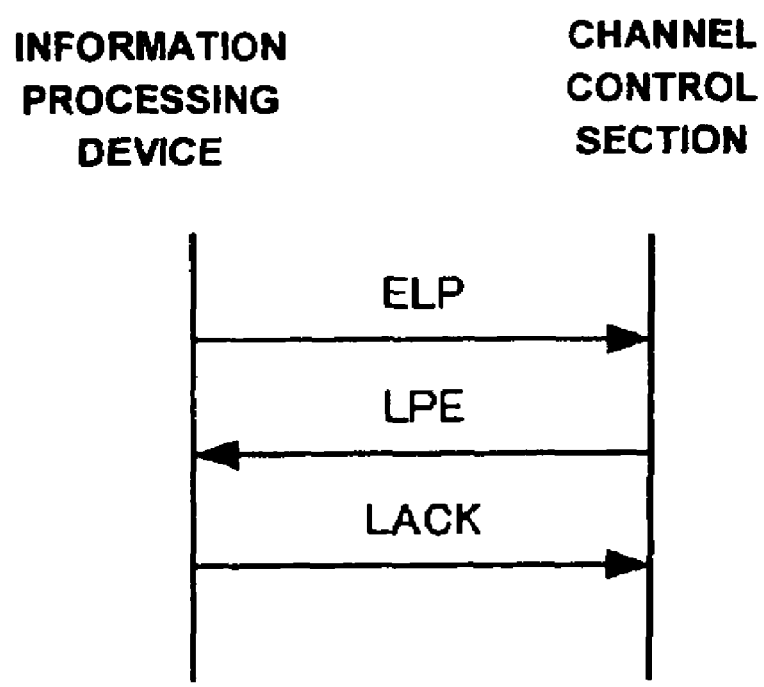
FIG. 8 shows a sequence of frames sent and received between the information processing device and the channel control section when establishing logical paths according to the present embodiment.
Figure 9:
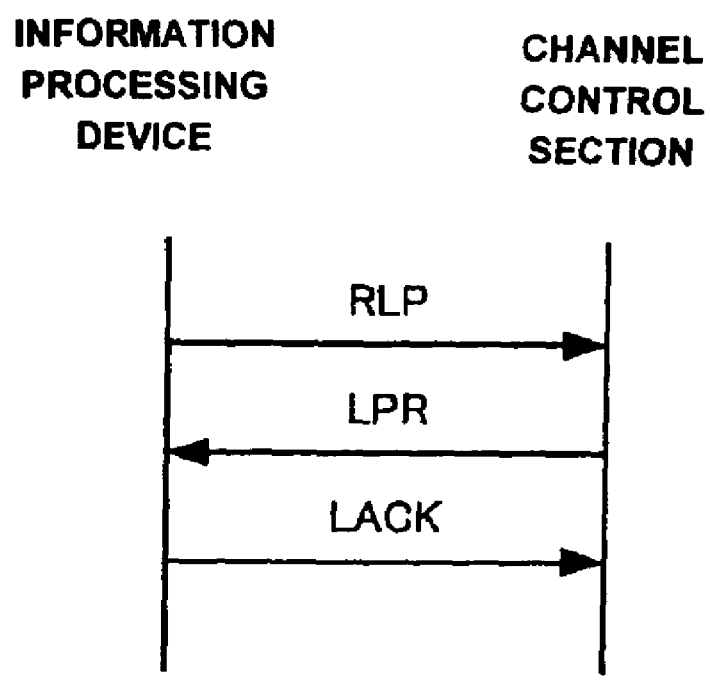
FIG. 9 shows a sequence of frames sent and received between the information processing device and the channel control section when deleting logical paths according to the present embodiment.

FIG. 8 shows a sequence of frames that are sent and received between the information processing device 200 and the channel control section 101 when establishing the logical path. First, the information processing device 200 sends an ELP (Establish Logical Path) frame to the channel control section 101. In the ELP frame are set the numbers assigned to the channel images 601, the number assigned to the port 210 of the information processing device 200, the number assigned to the port 401 of the disk array device 100, and the numbers assigned to the CU images 701 that correspond to the logical path to be established. Upon receiving the ELP frame, the protocol processor 406 of the channel control section 101 sends an LPE (Logical Path Established) frame to the information processing device 200. Upon receiving the LPE frame, the information processing device 200 sends a LACK (Link Level Acknowledgment) frame to the channel control section 101. This series of frame sending and receiving establishes the logical path. To delete a logical path that has been established, an RLP (Remove Logical Path) frame, an LPR (Logical Path Removed) frame, and the LACK frame shown in FIG. 9 are sent and received.

The above describes the configuration and basic operations of the disk array device 100. The following describes a method for the channel control section 101 to control the ports 401 that can be used by the information processing device 200.

[Port Control Based on the Number of Ports Available for Use]

Figure 10:
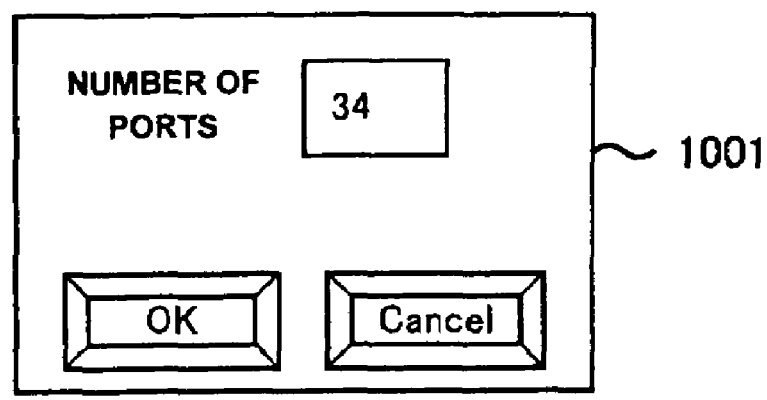
FIG. 10 shows an example of a screen for inputting the number of ports available for use through a management terminal according to the present embodiment.
Figure 11:
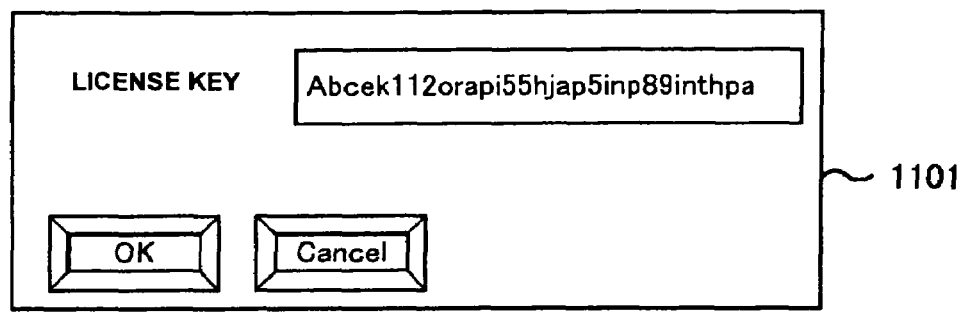
FIG. 11 shows an example of a screen for inputting a license key through the management terminal according to the present embodiment.

First, a method of port control based on the number of ports is described. A user who is installing the disk array device 100 decides "the number of ports available for use," which is the number of ports of the plurality of ports 401 that the user wants to use. The user pays a fee based on the number of ports available for use to the provider of the disk array device 100 and obtains a license key. The user inputs the number of ports available for use on a screen shown in FIG. 10 through the management terminal 106. To input the number of ports available for use, the user needs to input through the management terminal 106 the license key obtained from the provider on the screen shown in FIG. 11.

The number of ports available for use inputted is set in a "number of ports available for use" field of a port control table 1201 shown in FIG. 12. The port control table 1201 is stored in the shared memory 103 of the disk array device 100. In addition to this field, the port control table 1201 also has a "number of ports in use" field and a "port connection information" field. The "number of ports in use" field stores the number of the ports 401 whose use is permitted by the control section 101. The "port connection information" field stores the status of each of the ports 401 provided on the disk array device 100. The status of each of the ports 401 can be one of four states: "connected/operating," "connected/not operating," "unconnected," and "failure." "Connected/operating" indicates that the fiber channel cable 404 is connected to the port 401 and that the use of the port 401 is permitted by the control section 101. "Connected/not operating" indicates that the fiber channel cable 404 is connected to the port 401, but the use of the port 401 is prohibited by the control section 101. "Unconnected" indicates that the fiber channel cable 404 is not connected to the port 401. "Failure" indicates that some kind of failure has occurred on the port 401.

Figure 13:
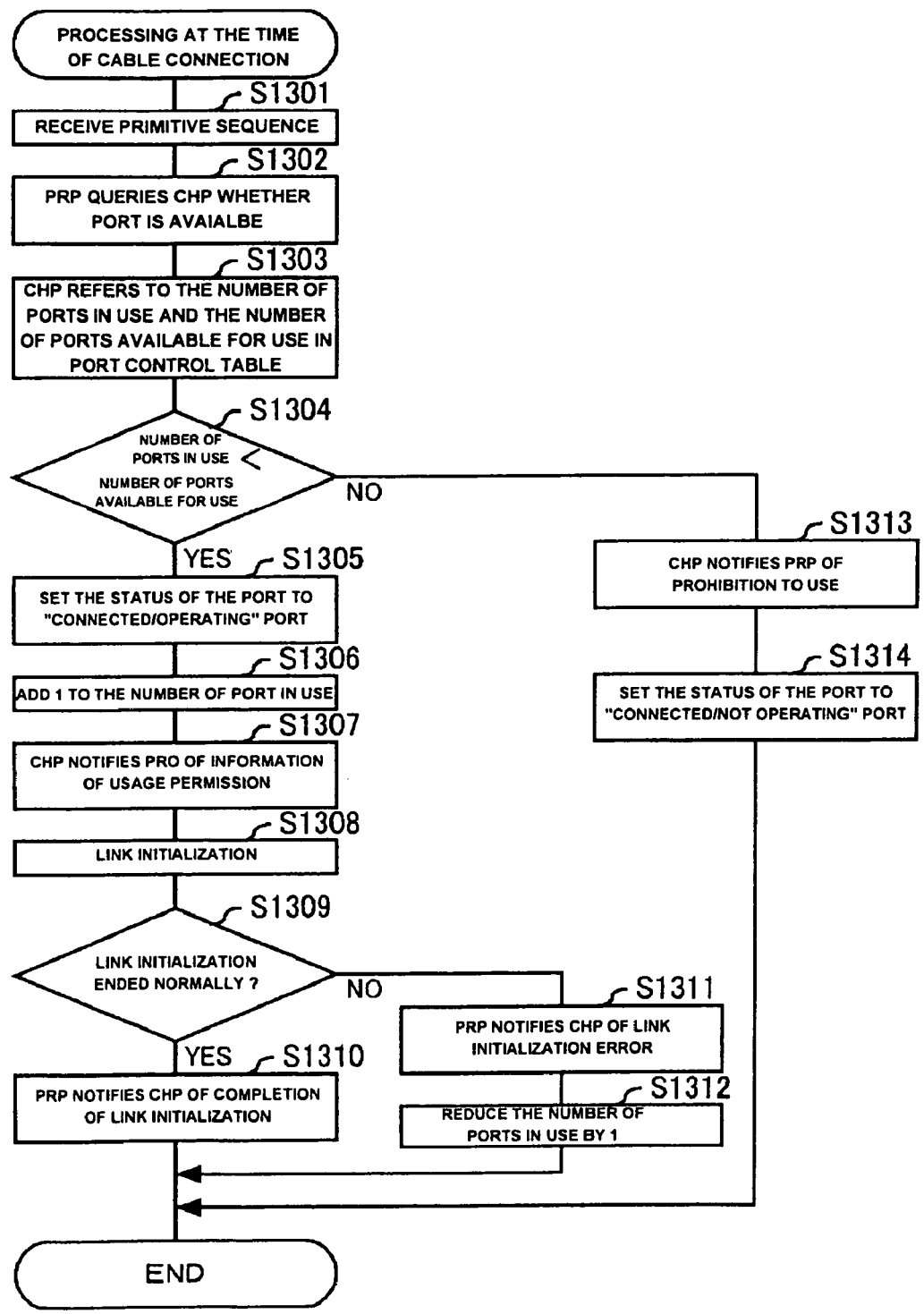
FIG. 13 is a flowchart of a processing by the channel control section when a fiber channel cable is connected to a port in a situation in which port control is based on the number of ports according to the present embodiment.

FIG. 13 is a flowchart of a processing by the channel control section 101 when the fiber channel cable 404 is connected to the port 401. Upon receiving the primitive sequence NOS (S 1301), the protocol processor 406 queries the channel processor 403 whether the corresponding port 401 is available for use (S1302). The channel processor 403 refers to the number of ports in use and the number of ports available for use in the port control table 1201 stored in the shared memory 103 (S1303) and checks whether the number of ports in use is less than the number of ports available for use (S1304).

If the number of ports in use is less than the number of ports available for use, the channel processor 403 sets the status of the port 401 to "connected/operating" in the port control table 1201 (S1305) and adds 1 to the number of ports in use (S1306). The channel processor 403 notifies the protocol processor 406 that the port 401 is permitted for use (S1307). Upon receiving the notice that the use is permitted, the protocol processor 406 sends and receives the primitive sequence 501 for initializing a physical link (S1308). The protocol processor 406 checks whether the link initialization processing ended normally (S1309). If the link initialization processing ended normally, the protocol processor 406 notifies the channel processor 403 that the link initialization is completed (S1310). If the link initialization processing did not end normally, the protocol processor 406 notifies the channel processor 403 that there was an error in the link initialization (51311). Upon receiving the notice of link initialization error, the channel processor 403 reduces the number of ports in use by 1 in the port control table 1201 (S1312).

If the number of ports in use is not less than the number of ports available for use, the channel processor 403 notifies the protocol processor 406 that the use of the port 401 is prohibited (S1313). The channel processor 403 sets the status of the port 401 to "connected/not operating" in the port control table 1201 (S1314). Upon receiving the notice that use is prohibited from the channel processor 403, the protocol processor 406 does not send back NOS for the port 401 to the information processing device 200. As a result, a physical link is not established between the port 401 and the information processing device 200, and the information processing device 200 cannot perform data input/output with the hard disk drives 121 via the port 401. Methods for not initializing links are not limited to not sending back NOS, and the protocol processor 406 can also not send back any of the frames shown in FIG. 5 in the link initialization processing to the information processing device 200.

Figure 14:
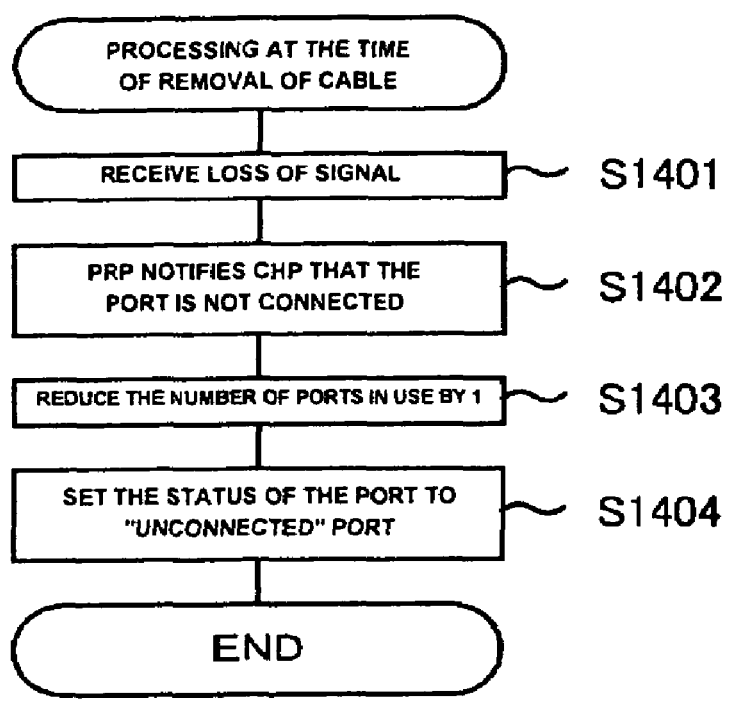
FIG. 14 is a flowchart of a processing by the channel control section when a fiber channel cable is pulled out from a port in a situation in which port control is based on the number of ports according to the present embodiment.

FIG. 14 is a flowchart of a processing by the channel control section 101 when the fiber channel cable 404 is removed from the port 401. Upon receiving Loss of Signal, which indicates that the fiber channel cable 404 has been removed (81401), the protocol processor 406 notifies the channel processor 403 that the fiber channel cable 404 is not connected to the port 401 (S 1402). The channel processor 403 reduces the number of ports in use by 1 (S 1403) and sets the status of the port 401 to "unconnected" (S1404) in the port control table 1201. To prevent an operation error due to a Loss of Signal detected as a result of a temporary connection failure of the port 401, for example, the protocol processor 406 may alert the channel processor 403 only if the fiber channel cable 404 remains removed for a certain amount of time after the Loss of Signal is received.

Through this, the number of the ports 401 available for use by the information processing device 200 can be limited in the disk array device 10 100 having a plurality of ports 401.

The user who installs the disk array device 100 must install the channel control section 101 for each package 403, regardless of the number of ports 401 required. This can result in unnecessary costs when installing the disk array device 100 for a user who does not need all of the ports 401 provided on the channel control section 101.

By limiting the number of ports 401 available for use by using the port control table 1201, costs based on the number of ports available for use can be set with regard to a plurality of ports 401 provided on the channel control section 101. Furthermore, when the number of ports available for use is added after the disk array device 100 is installed, costs based on the number of ports can be set. Consequently, the user of the disk array device 100 needs to assume only the cost for the number of ports that are needed, which would reduce the costs involved when installing the disk array device 100.

Even in situations in which costs cannot be set based on the number of ports, providers of disk array devices sometimes set costs based on the number of ports applied for by users. However, in such cases, the number of ports that are actually used by users cannot be ascertained, so that charges appropriate to the number of ports cannot be made. By limiting the number of ports 401 available for use through the port control table 1201, the provider of the disk array device 100 can charge appropriately for the ports 401 used by users.

In addition, users can install extra channel control sections 101 during the initial installation in consideration of future expandability. If the extra channel control sections 101 are not necessary, the costs associated with the ports 401 provided on those channel control sections 101 become unnecessary. If an increase in the amount of data results in a need to use the ports 401 on the extra channel control sections 101, the user can change settings of the port control table 1201 through the management terminal 106 and make the ports 401 of the extra channel control sections 101 available for use, without having a maintenance staff perform any work to add more channel control sections 101. This can result in shortening the time and reducing cost associated with port addition work.

The above describes a method for the channel control section 101 to control whether to make the ports 401 available for use based on the number of the ports 401 available for use, but whether to make the ports 401 available for use can be controlled based on the number of port groups 412 available for use, rather than the number of ports 401 available for use.

FIG. 15 shows a port control table 1501 that is used at the time of controlling whether to make the ports 401 available for use based on the number of the port groups 412. The port control table 1501 contains fields including "number of port groups available for use," "number of port groups in use," "port connection information," and "port group connection information" fields. In the "number of port groups available for use" field, the number of port groups 412 that are available for use and that are registered through the management terminal 106 is set. The screen for registering the number of port groups 412 available for use through the management terminal 106 is similar to the screen shown in FIG. 10 for registering the number of ports 401 available for use. In the "number of port groups in use" field, the number of the port groups 412 whose use is permitted by the control section 101 is stored. In the "port connection information" field, the status of each port 401 is stored, similar to the situation in which whether to make the ports 401 available for use is controlled based on the number of ports 401. In the "port group connection information" field, the status of each port group 412 provided on the disk array device 100 is stored. The status of each port group 412 can be one of three states: "use permitted," "use prohibited," and "failure." "Use permitted" indicates that the use of the port group 412 is permitted, and "use prohibited" indicates that the use of the port group 412 is prohibited. "Failure" indicates that some kind of failure has occurred on the port group 412.

Figure 16:
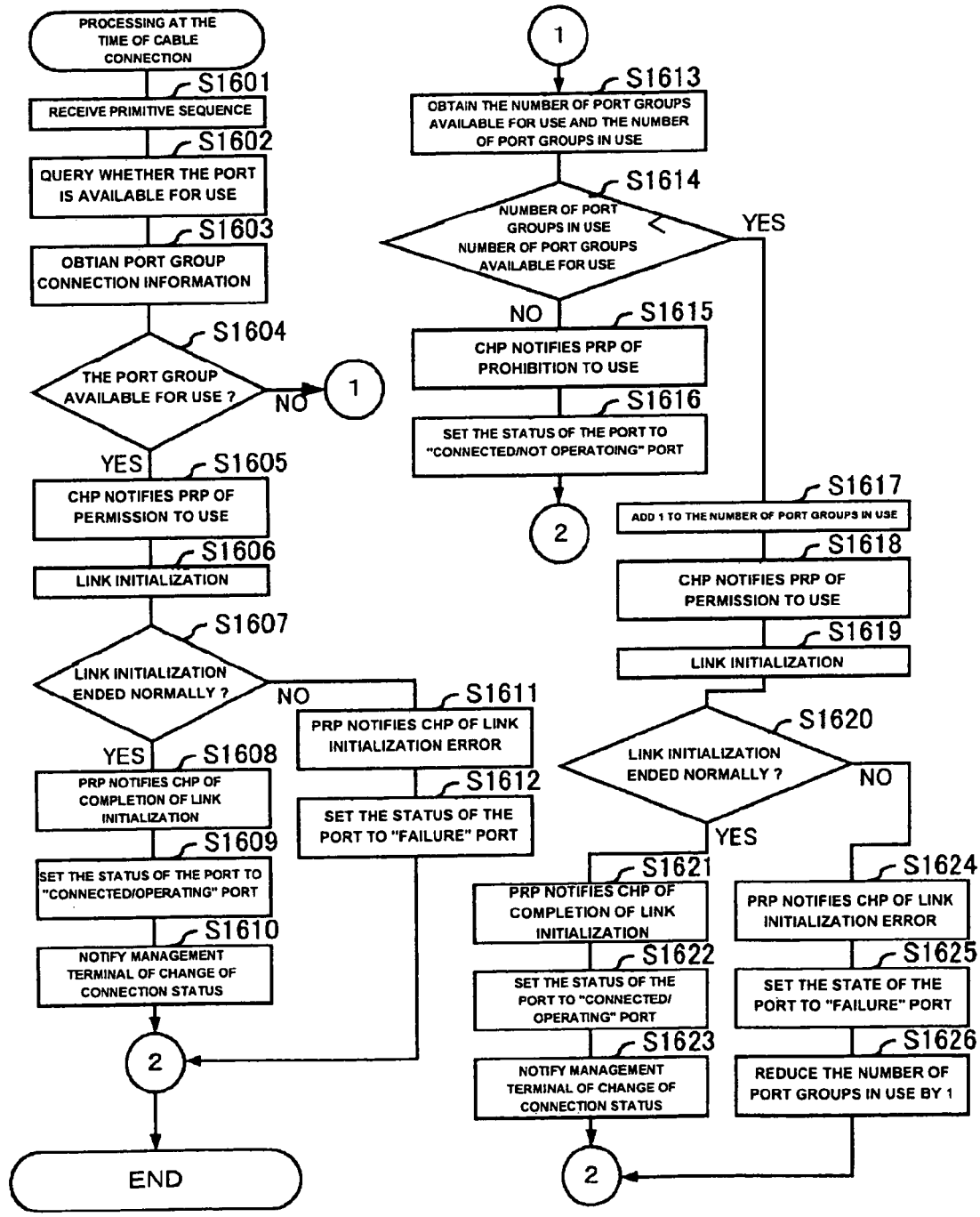
FIG. 16 is a flowchart of a processing by the channel control section when a fiber channel cable is connected to a port in a situation in which port control is based on the number of port groups according to the present embodiment.

FIG. 16 is a flowchart of a processing by the channel control section 101 when the fiber channel cable 404 is connected to the port 401, in a situation in which whether to make the ports 401 available for use is controlled based on the number of port groups 412.

Upon receiving the primitive sequence NOS for link initialization (S 1601), the protocol processor 406 queries the channel processor 403 as to whether the corresponding port 401 is available for use (S1602). The channel processor 403 obtains port group connection information from the port control table 1501 (S1603) and checks whether the port group 412 that the port 401 belongs to is in use permitted state (S1604).

If the port group 412 that the port 401 belongs to is permitted for use, the channel processor 403 notifies the protocol processor 406 that the port 401 is permitted for use (81605). Upon receiving the notice that the use is permitted, the protocol processor 406 sends and receives the primitive sequence 501 for link initialization (S1606). The protocol processor 406 checks whether the link initialization processing ended normally (S 1607). If the link initialization processing ended normally, the protocol processor 406 notifies the channel processor 403 that the link initialization is completed (S1608). The channel Is processor 403 sets the port connection information in the port control table 1501 to "connected/operating" state (S1609). The channel processor 403 notifies the management terminal 106 that the port connection information for the port 401 has been changed (S 1610). The reason for notifying the management terminal 106 of the change to the port connection information is to update information on a port status checking screen 1801, described later. If the link initialization processing did not end normally, the protocol processor 406 notifies the channel processor 403 that there was an error in the link initialization (S1611). Upon receiving the notice of link initialization error, the channel processor 403 sets the port connection information for the port 401 in the port control table 1501 to "failure" state (51612).

If the port group 412 to which the port 401 belongs is not permitted for use, the channel processor 403 obtains the number of port groups available for use and the number of port groups in use from the port control table 1501 (S1613). The channel processor 403 checks whether the number of port groups in use is less than the number of port groups available for use (S1614).

If the number of port groups in use is equal to or greater than the number of port groups available for use, the channel processor 403 notifies the protocol processor 406 that the use of the port 401 is prohibited (51615). The channel processor 403 sets the port connection information for the port 401 in the port control table 1501 to "connected/not operating" state and sets the port group connection information for the port group 412 to use prohibited (S1616). If the number of port groups in use is less than the number of port groups available for use, the channel processor 403 adds 1 to the number of port groups in use in the port control table 1501 (S1617). The channel processor 403 notifies the protocol processor 406 that the port 401 is permitted for use (S1618). Upon receiving the notice, the protocol processor 406 sends and receives the primitive sequence 501 for link initialization (S1619). The protocol processor 406 checks whether the link initialization processing ended normally (S1620). If the link initialization processing ended normally, the protocol processor 406 notifies the channel processor 403 that the link initialization is completed (S1621). The channel processor 403 sets the port connection information in the port control table 1501 to "connected/operating" state and sets the port group connection information for the port group 412 to use permitted (1622). The channel processor 403 notifies the management terminal 106 that the port connection information for the port 401 has been changed (S1623). If the link initialization processing did not end normally, the protocol processor 406 notifies the channel processor 403 that there was an error in the link initialization (S1624). Upon receiving the notice of link initialization error, the channel processor 403 sets the port connection information for the port 401 to "failure" state (S 1625) and reduces the number of port groups in use by 1 (S 1626) in the port control table 1501.

In this way, the number of ports 401 available for use by the information processing device 200 can be controlled based on the number of port groups 412 available for use. Similarly, the channel control section 101 can control the number of ports 401 available for use by the information processing device 200 based on the number of the protocol processors 406 or the number of the packages 413.

The channel control section 101 can also control whether to make the ports 401 available for use based on the number of logical paths.

FIG. 17 is a diagram of a port control table 1701 that is used when the channel control section 101 controls accesses from the information processing device 200 based on the number of logical paths that are established between the channel control section 101 and the information processing device 200. The port control table 1701 is provided with "number of logical paths available for use," "number of logical paths in use," and "logical path information" fields. In the "number of logical paths available for use" field, the number of logical paths that are available for use and that are registered through the management terminal 106 is set. The screen for registering the number of logical paths available for use through the management terminal 106 is similar to the screen shown in FIG. 10 for registering the number of ports available for use. In the "number of logical paths in use" field, the number of the logical paths whose use is permitted by the control section 101 and that are established with the information processing device 200 is stored. In the "logical path information" field, a control FLG, a CHL port #, a DKC port #, a CHL Img #, and a CU Img # are stored for each logical path number. The control FLG indicates whether the logical path is already established. The CHL port # indicates the port number assigned to each port 210 of the information processing device 200, and the DKC # indicates the port number assigned to each port 401 of the disk array device 100. The CHL Img # indicates the number assigned to each channel image 601, and the CU Img # indicates the number assigned to each CU image 701.

Upon receiving an ELP frame, which is a request to establish a logical path, from the information processing device 200, the channel control section 101 refers to the control FLG in the logical path information of the port control table 1701 and checks whether the logical path having the CHL port #, the DKC port #, the CHL Img #, and the CU Img # designated in the ELP frame is already established. If the logical path is already established, the channel control section 101 sends an LPE frame to the information processing device 200 and reestablishes the logical path. If the logical path has not been established, the channel control section 101 refers to the number of logical paths available for use and the number of logical paths in use in the port control table 1701 and checks whether the number of logical paths in use is less than the number of logical paths available for use. If the number of logical paths in use is less than the number of logical paths available for use, the channel control section 101 adds 1 to the number of logical paths in use in the port control table 1701 and sends the LPE frame to the information processing device 200. This establishes the logical path. If the number of logical paths in use is greater than the number of logical paths available for use, the channel control section 101 sends an LRJ (Link Level Reject) frame to the information processing device 200 and does not establish the logical path.

In this way, the channel control section 101 can control the number of ports 401 available for use by the information processing device 200 not only based on the number of physical ports 401, but also on the number of logical paths formed in the ports 401.

The above describes the methods for controlling the number of ports 401 available for use by the information processing device 200 based on such numbers as the number of ports available for use, the number of port groups, and the number of logical paths.

[Port Control Based on Numbers Assigned to Ports Available for Use]

The following describes how the ports 401 available for use by the information processing device 200 can be controlled by designating port numbers.

Figure 18:
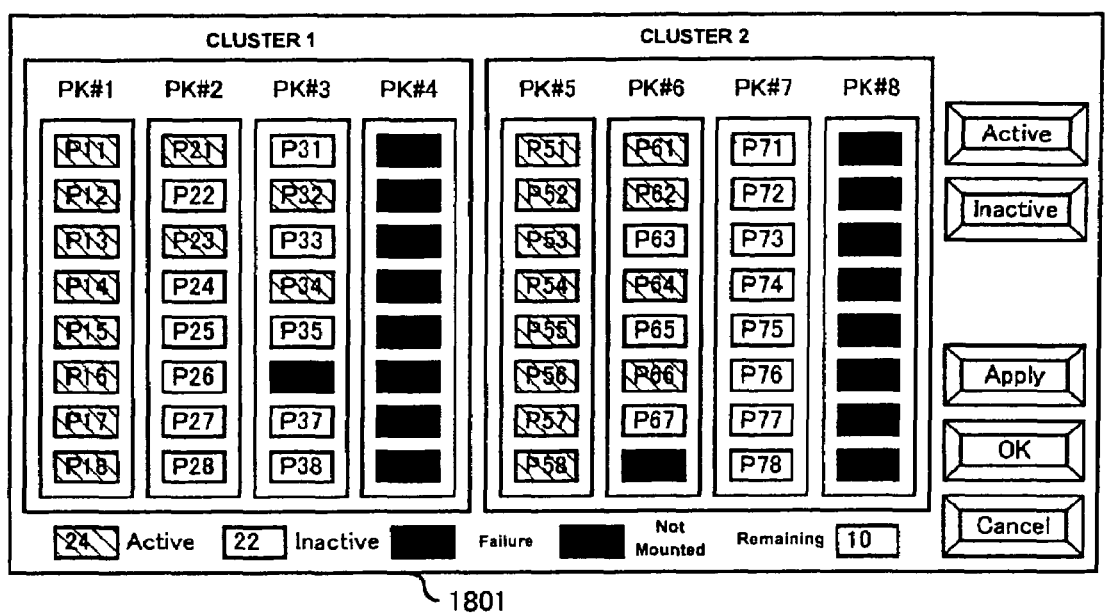
FIG. 18 shows an example of a screen for registering ports available for use through the management terminal according to the present embodiment.
Figure 19:
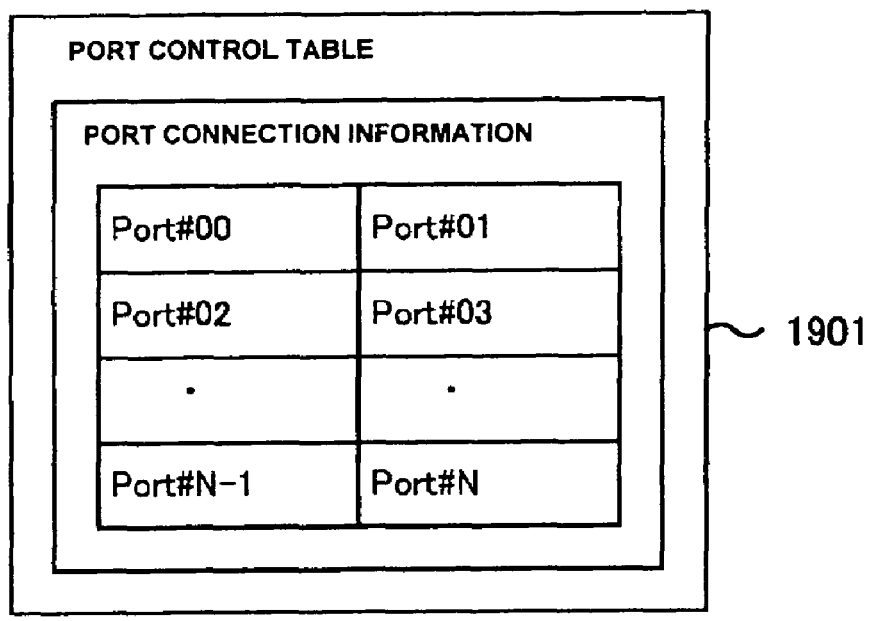
FIG. 19 shows an example of a port control table for controlling ports based on port numbers according to the present embodiment.

First, a description is made as to a method for controlling the ports 401 available for use by the information processing device 200, using port numbers assigned to the ports 401 provided on the channel control section 101. FIG. 18 is a diagram of the screen 1801, which is used for registering the ports 401 available for use through the management terminal 106. The screen 1801 displays the status of each of the ports 401 provided on the channel control section 101 and the number of the ports 401 in each state. The status of the ports 401 can be "Active," "Inactive," "Failure," or "Not Mounted." "Active" indicates that the use of the port 401 is permitted. "Inactive" indicates that the use of the port 401 is not permitted. "Failure" indicates that some kind of failure has occurred on the port 401. "Not Mounted" indicates that the port 401 can be mounted on the disk array device 100 but has not yet been mounted. When the user selects the port 401 in "Inactive" state, presses an "Active" button, and presses an "Apply" button on the screen 1801, the port 401 changes to "Active" state. When the user selects the port 401 in "Active" state, presses an "Inactive" button, and presses the "Apply" button, the port 401 changes to "Inactive" state. The status of each port 401 set in this way is stored in a port control table 1901, shown in FIG. 19. The port control table 1901 is stored in the shared memory 103, and stores information as to whether each port 401 is available for use as set through the management terminal 106.

Figure 20:
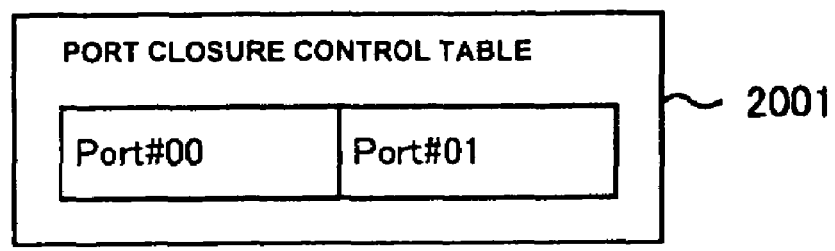
FIG. 20 shows an example of a port closure control table for controlling ports based on port numbers according to the present embodiment.

Upon receiving a change notice to the port control table 1901 from the management terminal 106, the channel processor 403 refers to port connection information in the port control table 1901. The channel processor 403 sets the availability of connection for each port 401 in a port closure control table 2001, shown in FIG. 20. The port closure control table 2001 is stored in the control register 407 of the protocol control section 402 that controls the corresponding port 401.

Upon receiving the NOS from the information processing device 200, the protocol processor 406 refers to the control register 407 and determines whether the corresponding port 401 is available for use. If use is permitted, the protocol 406 responds to the primitive sequence and establishes a physical link. If use is not permitted, the protocol processor 406 does not respond to the primitive sequence and does not establish any physical link.

In this way, by designating the number assigned to each port 401, the ports 401 available for use by the information processing device 200 can be controlled.

The screen 1801 in FIG. 18 can also be used to check the status of each port 401 when the ports 401 available for use is controlled based on the number of ports, which was described earlier. In this case, "Active" represents "connected/operating," and "Inactive" represents "connected/not operating" or "not connected." If the number of ports in use is less than the number of ports available for use, the balance, or the remaining number of ports that can be used, is displayed in a "balance" field. The management terminal 106 refers to the port control table 1201 in the shared memory 103 periodically or based on notices from the channel processor 403 and updates information on the screen 1801.

Figure 21:
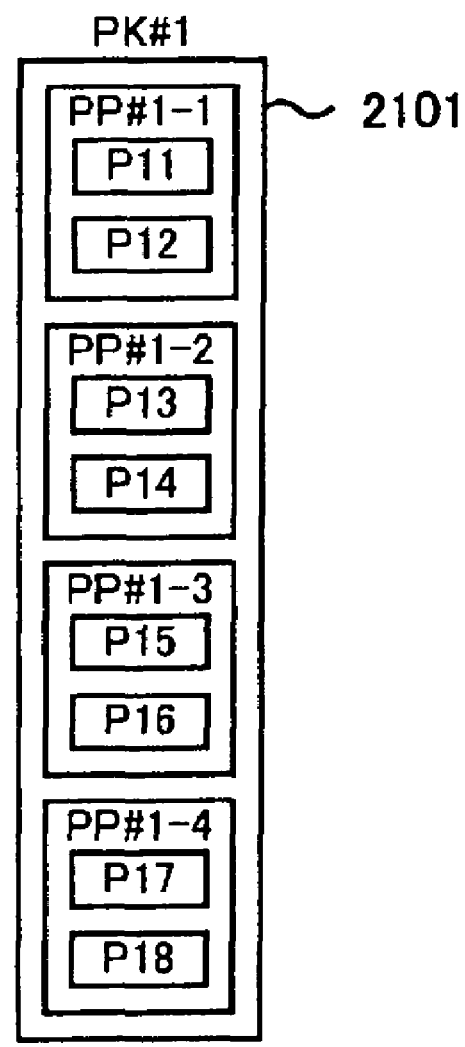
FIG. 21 shows an example of a screen for registering protocol processors available for use through the management terminal according to the present embodiment.

The above describes a method for the channel control section 101 to control whether to make the ports 401 available for use based on the port numbers assigned to the ports 401. Similarly, whether to make each port 401 available for use can be controlled by designating the numbers assigned to the protocol processors 406, the port groups 412, the packages 413, the port plugs 405, the protocol control sections 402, or the hubs 409. For example, whether to make each port 401 available for use based on the designation of the numbers assigned to the protocol processors 406 can be set through a screen 2101, shown in FIG. 21, in which the display of the ports 401 on the screen 1801 is altered to make it possible to designate the ports 401 on a per protocol processor 406 basis.

[Control of Changes to the Number of Ports Available for Use]

The following describes an operation for changing through the management terminal 106 the number of ports available for use when the number of ports 401 available for use by the information processing device 200 is controlled based on the number of ports.

Figure 22:
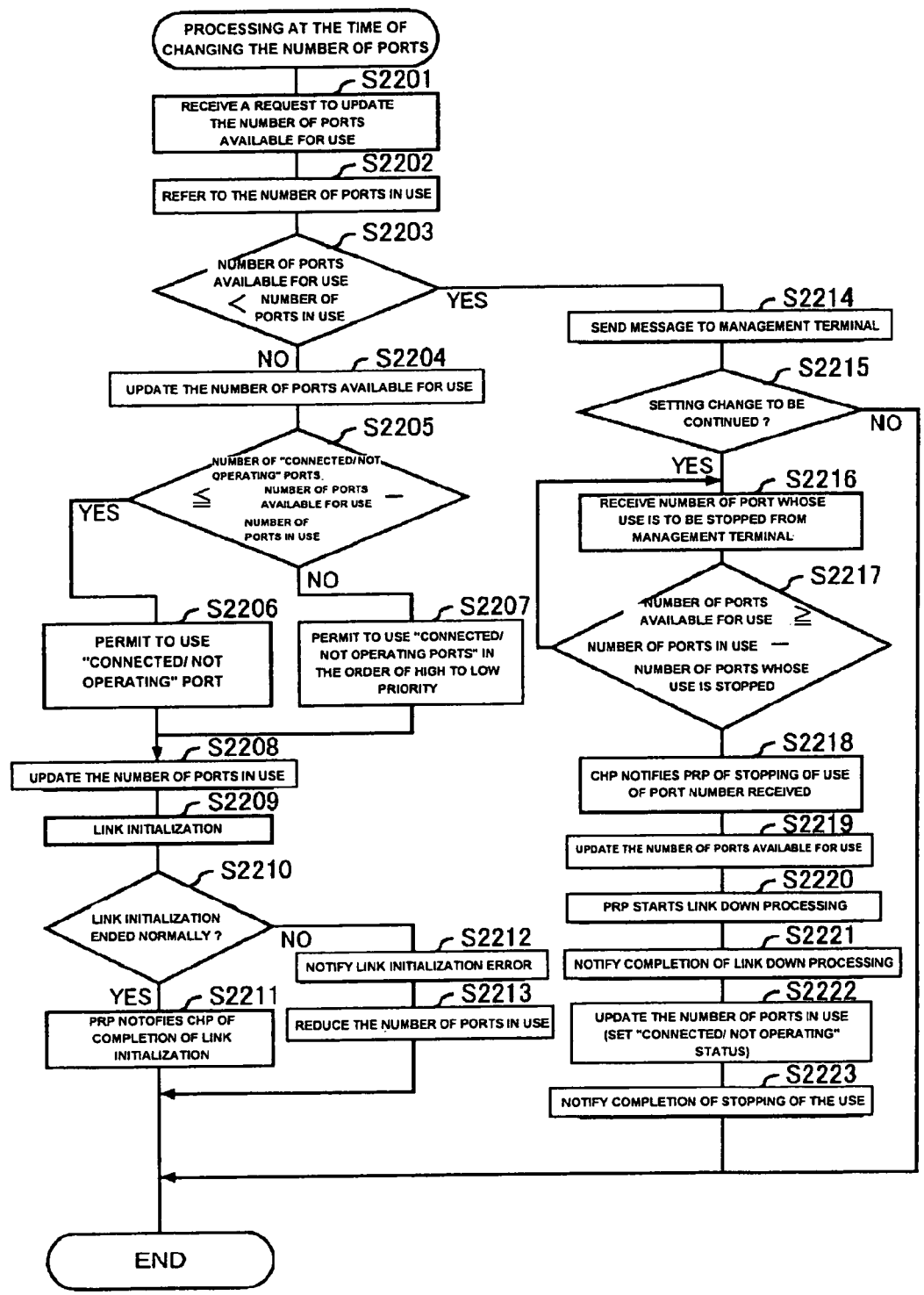
FIG. 22 is a flowchart of a processing by the channel control section when a request to change the number of ports available for use is inputted through the management terminal in a situation in which port control is performed based on the number of ports according to the present embodiment.

FIG. 22 is a flowchart of a processing that takes place when the channel control section 101 receives from the management terminal 106 a request to change the number of ports available for use. The screen for changing the number of ports available for use through the management terminal 106 is similar to the screen 1001 in FIG. 10.

Upon receiving from the management terminal 106 a request to update the number of ports available for use (S2201), the channel processor 403 refers to the number of ports in use in the port control table 1201 (S2202). The channel processor 403 checks whether the number of ports available for use that was received from the management terminal 106 is less than the number of ports in use (S2203).

If the number of ports available for use that was received from the management terminal 106 is equal to or greater than the number of ports in use, the channel processor 403 sets the number of ports available for use that was received from the management terminal 106 as the number of ports available for use in the port control table 1201 (S2204). The channel processor 403 refers to the port connection information in the port control table 1201 and checks whether the number of ports 401 in "connected/not operating" state is equal to or less than the difference between the number of ports available for use and the number of ports in use (S2205). If the number of ports 401 in "connected/not operating" state is equal to or less than the difference between the number of ports available for use and the number of ports in use, the channel processor 403 notifies the protocol processor 406 that all of the ports 401 in "connected/not operating" state are permitted for use (S2206). If the number of ports 401 in "connected/not operating" state is not equal to or less than the difference between the number of ports available for use and the number of ports in use, the channel processor 403 selects the ports 401 in "connected/not operating " state in the number equivalent to the difference between the number of ports available for use and the number of ports in use, and in the order of high to low priority, and notifies the protocol processor 406 that the ports 401 selected are permitted for use (S2207). The channel processor 403 changes the number of ports in use in the port control table 1201 (S2208). The priority of each port 401 is set in the port connection information of the port control table 1201.

The protocol processor 406 sends and receives to and from the information processing device 200 the primitive sequence 501 for initializing a physical link with each port 401 whose use was permitted (S2209). The protocol processor 406 checks whether the link initialization processing ended normally (S2210). If the link initialization processing ended normally, the protocol processor 406 notifies the channel processor 403 that the link initialization is completed (S2211). If the link initialization processing did not end normally, the protocol processor 406 notifies the channel processor 403 that there was an error in the link initialization (S2212). Upon receiving the notice of link initialization error, the channel processor 403 reduces the number of ports in use in the port control table 1201 by the number of ports 401 whose link initialization ended in error (S2213).

If the number of ports available for use that was received from the management terminal 106 is less than the number of ports in use, the channel processor 403 notifies the management terminal 106 that the number of ports available for use is less than the number of ports in use (S2214). The channel processor 403 receives from the management terminal 106 a decision as to whether to continue the setting change processing (S2215). If the setting change is not to be continued, the channel processor 403 terminates the processing without updating the number of ports available for use in the port control table 1201. If the setting change is to be continued, the channel processor 403 receives from the management terminal 106 the port numbers assigned to the ports 401 whose use is to be stopped (S2216). The channel processor 403 checks whether the difference between the number of ports in use and the number of ports 401 whose use is to be stopped is equal to or less than the number of ports available for use (S2217). If the difference between the number of ports in use and the number of ports 401 whose use is to be stopped is equal to or less than the number of ports available for use, the channel processor 403 notifies the protocol processor 406 to stop the use of the ports 401 with number assignments received from the management terminal 106 (S2218). The channel processor 403 sets the number of ports available for use that was received from the management terminal 106 as the number of ports available for use in the port control table 1201 (S2219). Upon receiving the notice to stop the use of the ports 401 from the channel processor 403, the protocol processor 406 begins a processing to disconnect physical links with the corresponding ports 401 (S2220).

The link disconnection takes place by sending an OLS for 5 ms or more. The protocol processor 406 notifies the channel processor 403 that the link disconnection processing is completed (S2221). The channel processor 403 reduces the number of ports in use by the number of the ports 401 whose use was stopped and sets the status of those ports 401 to "connected/not operating" in the port control table 1201 (S2222). The channel processor 403 notifies the management terminal 106 that stopping the use of the ports 401 has been completed and terminates the processing. Instead of receiving from the management terminal 106 the port numbers assigned to the ports 401 whose use is to be stopped, the ports 401 whose use is to be stopped can be selected based on the priority of the ports 401.

In a manner described above, when the number of ports available for use is changed through the management terminal 106, the status of each port 401 can be changed based on the number of ports available for use after the change. For example, when increasing the number of ports available for use after installing the disk array device 100, the ports 401 to which the fiber channel cables 404 are connected but whose use is not permitted can be made available for use. When reducing the number of ports available for use, the number of ports 401 in use can be changed to the number of ports available for use. In either case, work such as inserting or removing the fiber channel cables 404 is not necessary and making setting changes to the port control table 1201 through the management terminal 106 is all that is required, which can shorten time and reduce costs associated with such work.

The above describes the processing for changing the number of ports available for use; however, the number of protocol processors available for use, the number of port groups available for use, and the number of packages available for use can also be changed through similar procedures.

[Control of Switching Ports in Use]

Next, a method will be described for switching the status of two ports 401 when the number of the ports 401 available for use by the information processing device 200 is controlled based on the number of ports.

Figure 23:
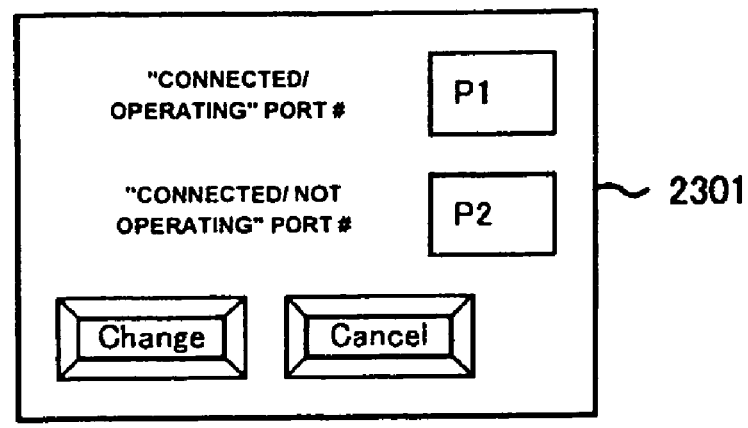
FIG. 23 shows an example of a screen for designating switching the status of two ports through the management terminal according to the present embodiment.

FIG. 23 shows a screen 2301, which is used for designating the two ports 401 whose respective status are to be switched through the management terminal 106. When the user inputs the port number of the port 401 in "connected/operating" state and the port number of the port 401 in "connected/not operating" state on the screen 2301 and presses a "Change" button, a switch request, in which are set the port numbers of the two ports 401, is sent to the channel control section 101.

Figure 24:
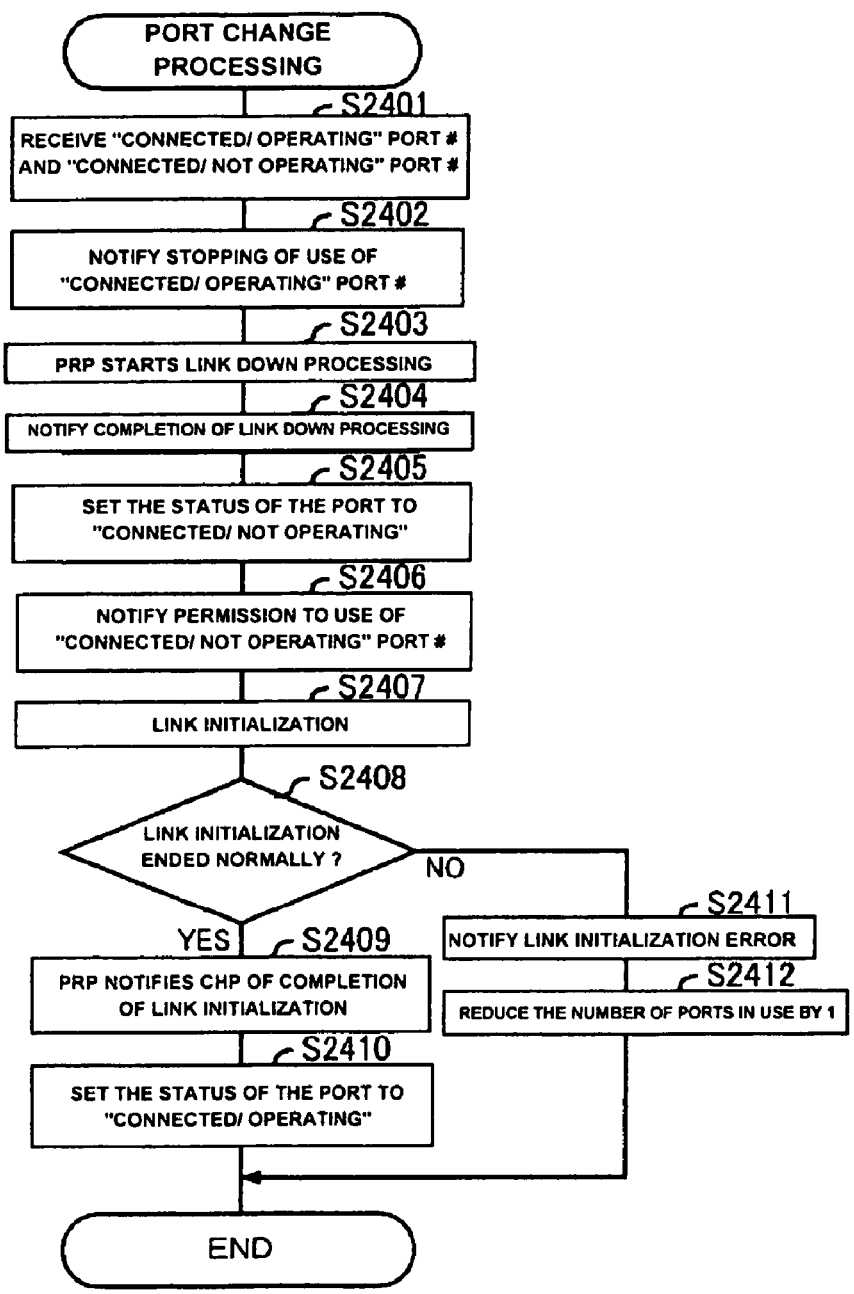
FIG. 24 is a flowchart of a processing by the channel control section for switching the status of two ports according to the present embodiment.

FIG. 24 is a flowchart of a processing by the channel control section 101 to switch the status of the two ports 401. The channel processor 403 receives from the management terminal 106 a switch request, in which are set the port number of the port 401 in "connected/operating" state and the port number of the port 401 in "connected/not operating" state (52401).

First, the channel processor 403 notifies the protocol processor 406 to stop using the port 401 in "connected/operating" state designated by the management terminal 106 (52402). The protocol processor 406 begins a processing to disconnect the physical link with the port 401 (S2403). The protocol processor 406 notifies the channel processor 403 that the link disconnection processing is completed (S2404). The channel processor 403 sets the port connection information for the port 401 to "connected/not operating" in the port control table 1201 (52405)

Next, the channel processor 403 notifies the protocol processor 406 that the port 401 in "connected/not operating" state designated by the management terminal 106 is permitted for use (S2406). The protocol processor 406 sends and receives to and from the information processing device 200 the primitive sequence 501 for initializing a physical link (S2407). The protocol processor 406 checks whether the link initialization processing ended normally (S2408). If the link initialization processing ended normally, the protocol processor 406 notifies the channel processor 403 that the link initialization is completed (82409). The channel processor 403 sets the port connection information for the port 401 to "connected/operating" in the port control table 1201 (S2410). If the link initialization processing did not end normally, the protocol processor 406 notifies the channel processor 403 that there was an error in the link initialization (S2411). Upon receiving the notice of link initialization error, the channel processor 403 reduces the number of ports in use by 1 in the port control table 1201 (S2412).

In this way, the status of two ports 401 can be switched through an input from the management terminal 106. For example, to be prepared in the event of a failure of any of the ports 401, the fiber channel cables 404 can be connected to the ports 401 in numbers greater than the number of ports available for use as set in the port control table 1201 when the disk array device 100 is installed. If a failure is detected in one of the ports 401 in use, the port 401 can be prohibited from use and another port 401 to which the fiber channel cable 404 is connected but which is prohibited from use can be made available for use. In this case, work such as inserting or removing the fiber channel cables 404 is not necessary and making setting changes to the port control table 1201 through the management terminal 106 is all that is required, which can shorten time and reduce costs associated with such work.

[Control of Number of Ports Depending on, Time Period]

The method for controlling the number of ports 401 available for use by the information processing device 200 based on the number of ports has been described above. Next, a method for changing the number of ports available for use depending on time period will be described.

FIG. 25 is a diagram of a port control table 2501 that is used for changing the number of ports available for use depending on the time period. The port control table 2501 is provided with "timetable of the number of ports available for use," "number of ports in use," "port connection information" and "total time used of all ports" fields. The "timetable of number of ports available for use" field stores the number of ports available for use in each time period. The example in FIG. 5 shows that the number of ports available for use from 9:00 to 17:00 is "4" and that the number of ports available for use from 17:00 to 9:00 is "8." The "number of ports in use" stores the number of ports 401 whose use is permitted by the control section 101. The "port connection information" field stores the status, priority and the amount of time used for each port 401. The status of each of the ports 401 can be "connected/operating," "connected/not operating" or "failure," as described earlier. The "total time used of all ports" field stores the total time used of all of the ports 401.

Figure 26:
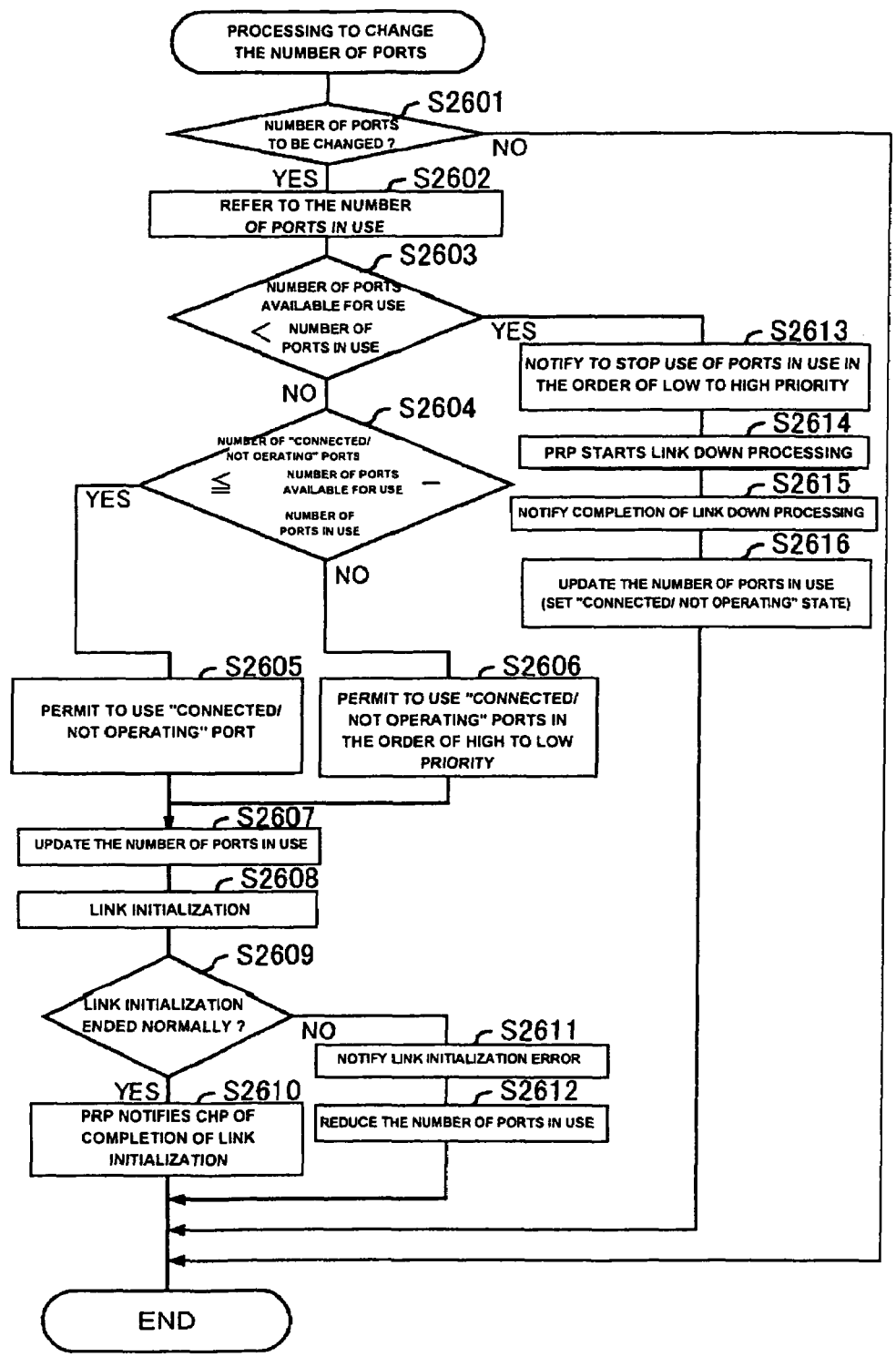
FIG. 26 is a flowchart of a processing by the channel control section for changing the number of ports available for use depending on the time period according to the present embodiment.

FIG. 26 is a flowchart of a processing by the channel control section 101 for changing the number of ports available for use depending on the time period. The channel processor 403 refers to the timetable of the number of ports available for use in the port control table 2501 and executes a processing to change the number of ports, shown in FIG. 26, when the time period to which the current time belongs changes.

The channel processor 403 compares the number of ports available for use in the preceding time period with the number of ports available for use in the current time period and checks whether there is any change in the number of ports (S2601). If there is a change in the number of ports, the channel processor 403 refers to the number of ports in use in the port control table 2501 (S2602) and checks whether the number of ports available for use in the current time period is less than the number of ports in use (S2603).

If the number of ports available for use is equal to or greater than the number of ports in use, the channel processor 403 checks whether the number of ports 401 in "connected/not operating" state is equal to or less than the difference between the number of ports available for use and the number of ports in use (S2604). If the number of ports 401 in "connected/not operating" state is equal to or less than the difference between the number of ports available for use and the number of ports in use, the channel processor 403 notifies the protocol processor 406 that all of the ports 401 in "connected/not operating" state is permitted for use (S2605).

If the number of ports 401 in "connected/not operating" state is not equal to or less than the difference between the number of ports available for use and the number of ports in use, the channel processor 403 selects the ports 401 in "connected/not operating" state in the number equivalent to the difference between the number of ports available for use and the number of ports in use and in the order of high to low priority, and notifies the protocol processor 406 that the ports 401 selected are permitted for use (S2606). The channel processor 403 changes the number of ports in use and sets the status of the ports 401 that have been permitted for use to "connected/operating" state in the port control table 2501 (S2607).

The protocol processor 406 sends and receives to and from the information processing device 200 the primitive sequence 501 for initializing a physical link with each of the ports 401 whose use was permitted (S2608). The protocol processor 406 checks whether the link initialization processing ended normally (S2609). If the link initialization processing ended normally, the protocol processor 406 notifies the channel processor 403 that the link initialization is completed (S2610). If the link initialization processing did not end normally, the protocol processor 406 notifies the channel processor 403 that there was an error in the link initialization (S2611). Upon receiving the notice of link initialization error, the channel processor 403 reduces the number of ports in use in the port control table 2501 by the number of ports 401 whose link initialization ended in error (S2612).

If the number of ports available for use in the current time period is less than the number of ports in use, the channel processor 403 selects the ports 401 in "connected/operating" state in the number equivalent to the difference between the number of ports available for use and the number of ports in use and in the order of low to high priority, and notifies the management terminal 406 to stop the use of the ports 401 selected (S2613). Upon receiving the notice to stop the use of the ports 401 from the channel processor 403, the protocol processor 406 begins a processing to disconnect physical links with the ports 401 (S2614). The protocol processor 406 notifies the channel processor 403 that the link disconnection processing is completed (S2615). The channel processor 403 reduces the number of ports in use by the number of ports 401 whose use was stopped and sets the status of those ports 401 to "connected/not operating" state in the port control table 2501 (S2616).

The channel processor 403 periodically refers to the port control table 2501 and updates the time used for the ports 401 in "connected/operating" state and the "total time used of all ports."

In this way, the number of the ports 401 available for use by the information processing device 200 can be changed depending on the time period. For example, in situations where input/output load on the disk array device 100 varies in different time periods, such as performing online operations during the day and batch processing at night, the number of ports available for use can be set depending on the time period. Further, by storing the time used for each port 401, fees can be charged based on the time used for each port 401. As a result, users of the disk array device 100 can not only select fee charging based on the number of ports used when the input/output load is at maximum, but also fee charging that suits the user's usage mode, and thereby reduce costs.

[Measuring Usage Rate by Ports]

So far, methods for controlling the ports 401 available for use by the information processing device 200 have been described. Next, a method for the channel control section 101 to measure the usage rate of each port 401 will be described.

FIG. 27 is a diagram of a performance monitoring table that the channel control section 101 refers to. A performance monitoring table 2701 is provided with "measurement time interval," "port usage rate threshold," and "port information" fields, and is stored in the shared memory 103. The "measurement time interval" and the "port usage rate threshold" are registered through the management terminal 106 using a screen similar to the screen 1001 in FIG. 10.

The channel processor 403 refers to the measurement time interval in the performance monitoring table 2701 and measures the usage rate of each port 401 based on the measurement time interval. The usage rate of each of the ports 401 is found from the proportion of the time that each port 401 is actually used in a certain amount of time. The channel processor 403 stores the measured usage rate in the port information of the performance monitoring table 2701. If there is any port 401 whose usage rate exceeds the port usage rate threshold set in the performance monitoring table 2701, the channel processor 403 notifies of it to the management terminal 106.

Figure 28:
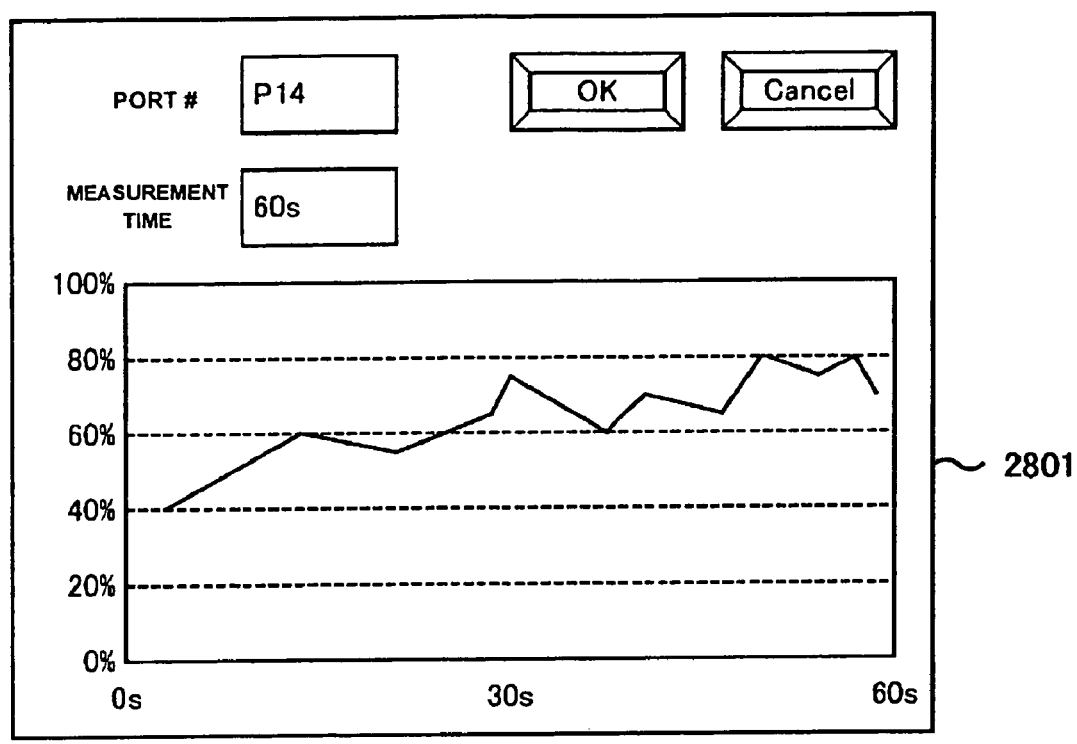
FIG. 28 shows an example of a screen displaying the usage rate of ports through the management terminal according to the present embodiment.

Using a screen 2801 in FIG. 28, the management terminal 106 can check the transition of usage rate of each of the ports 401. To display the usage rate of any of the ports 401, the user inputs the number assigned to the port 401 and the measurement time and presses an "OK" button on the screen 2801. The management terminal 106 refers to the usage rate stored in the performance monitoring table 2701 for the port 401 designated during the measurement time designated, and shows data representing the usage rate, such as, a line graph thereof on the screen 2801.

Based on this, the user can check whether there are any ports 401 with high load. Furthermore, the user can use this information to decide whether to add more ports 401 available for use. Consequently, it becomes possible to have the number of ports 401 available for use in a number appropriate to the actual data amount, and cost increase resulting from adding superfluous ports 401 or processing performance decline resulting from insufficient number of ports 401 can be prevented.

The above describes the present embodiment, but the embodiment example serves only to facilitate the understanding of the present invention and should not be interpreted to limit the present invention. Many modifications can be made without departing from the present invention.

For example, the information processing device 200 according to the present embodiment is not limited to a mainframe; but it can be a personal computer or workstation or other open system computer.

If the system is an open system, the logical paths can be replaced with paths that represent the combinations of the ports 210 of the information processing device 200 and the ports 401 of the disk array device 100. The ELP frame in the mainframe is equivalent to PLOGI frame sent by the information processing device 200 to the disk array device 100 in open systems. Further, the LPE frame in the mainframe is equivalent to a response frame that indicates PLOGI (port log in) completion sent by the disk array device 100 to the information processing device 200 in open systems. The LRJ frame in the mainframe is equivalent to a response frame that indicates PLOGI rejection sent by the disk array device 100 to the information processing device 200 in open systems.

When controlling the number of ports available for use based on the number of paths in an open system, the logical path information in the port control table 1701 in FIG. 17 should store WWNs (World Wide Names) of the ports 210 of the information processing device 200 and DKC port #s, which are port numbers assigned to the ports 401 of the disk array device 100. With these, the number of ports available for use can be controlled based on the number of paths in open systems as in mainframes.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk array device comprising:
a plurality of hard disk drives;
at least one channel control section having a plurality of ports that are connectable to at least one information processing device via cables, and that receives data input/output requests from the least one information processing device to the plurality of hard disk drives; and
at least one disk control section that is communicatably connected to the plurality of hard disk drives and that sends data input/output requests to the plurality of hard disk drives based on the data input/output requests to the plurality of hard disk drives that are received by the at least one channel control section;
wherein a cost which an user should pay is set depending on the number of ports available for use,
wherein the number of ports in use is compared to the number of ports available for use, and
wherein when the number of ports in use is less than the number of ports available for use, the at least one channel control section responds to a connection request received from the at least one information processing device, and when the number of ports in use is equal to the number of ports available for use, the at least one channel control section does not respond to the connection request.

2. A disk array device according to claim 1, wherein, when the number of ports available for use is increased, a cost that the user should pay is set depending on the number of the added ports available for use.

3. A method for controlling a disk array device, the disk array device comprising a plurality of hard disk drives, at least one channel control section having a plurality of ports that are connectable to at least one information processing device via cables, and that receives data input/output requests from the least one information processing device to the plurality of hard disk drives, and at least one disk control section that is communicatably connected to the plurality of hard disk drives and that sends data input/output requests to the plurality of hard disk drives based on the data input/output requests to the plurality of hard disk drives that are received by the at least one channel control section, the method comprising the steps conducted by the at least one channel control section:

setting a cost which an user should pay depending on the number of ports available for use;
comparing the number of ports in use to the number of ports available for use;
responding to a connection request received from the at least one information processing device when the number of ports in use is less than the number of ports available for use; and
not responding to the connection request when the number of ports in use is equal to the number of ports available for use.

4. A method of controlling a disk array device according to claim 3, further comprising the step of:

setting a cost which the user should pay depending on the number of the added ports available for use when the number of ports available for use is increased.

5. A disk array device comprising:
a plurality of hard disk drives;
at least one channel control section having a plurality of ports that are connectable to at least one information processing device via cables, and that receives data input/output requests from the least one information processing device to the plurality of hard disk drives; and
at least one disk control section that is communicatably connected to the plurality of hard disk drives and that sends data input/output requests to the plurality of hard disk drives based on the data input/output requests to the plurality of hard disk drives that are received by the at least one channel control section,
wherein, if a failure is detected in one of the ports in use, the failed port is prohibited from being used and another port which has been prohibited from being used is made available for use,
wherein the number of ports in use is compared to the number of ports available for use, and
wherein when the number of ports in use is less than the number of ports available for use, the at least one channel control section responds to a connection request received from the at least one information processing device, and when the number of ports in use is equal to the number of ports available for use, the at least one channel control section does not respond to the connection request.

6. A disk array device according to claim 5, wherein the channel control section has a number of ports no less than the number of ports available for use, and
an attribute of prohibition of use is set on the ports extra to the number of the ports available for use.

7. A disk array device according to claim 5, wherein the prohibiting of the failed port from being used and the making of another port available for use is performed by input through a management terminal connected to the disk array device.

8. A disk array device according to claim 6, wherein the setting of the attribute of prohibition of use on the ports extra to the number of the ports available for use is performed by input through a management terminal connected to the disk array device.

9. A method for controlling a disk array device, the disk array device comprising a plurality of hard disk drives, at least one channel control section having a plurality of ports that are connectable to at least one information processing device via cables, and that receives data input/output requests from the least one information processing device to the plurality of hard disk drives, and at least one disk control section that is communicatably connected to the plurality of hard disk drives and that sends data input/output requests to the plurality of hard disk drives based on the data input/output requests to the plurality of hard disk drives that are received by the at least one channel control section, the method comprising the steps conducted by the at least one channel control section:

prohibiting, if a failure is detected in one of the ports in use, the failed port from being used and making another port which has been prohibited from being used available for use;
comparing the number of ports in use to the number of ports available for use;
responding to a connection request received from the at least one information processing device when the number of ports in use is less than the number of ports available for use; and not responding to the connection request when the number of ports in use is equal to the number of ports available for use.

10. A method of controlling a disk array device according to claim 9, wherein the channel control section has a number of ports no less than the number of ports available for use, the method further comprising the step of
setting an attribute of prohibition of use on the ports extra to the number of the ports available for use.

11. A method of controlling a disk array device according to claim 9, wherein the prohibiting of the failed port from being used and the making of another port available for use is performed by input through a management terminal connected to the disk array device.

12. A method of controlling a disk array device according to claim 10, wherein the setting of the attribute of prohibition of use on the ports extra to the numbers of ports available for use is performed by input through a management terminal connected to the disk array device.

13. A disk array device comprising:
a plurality of hard disk drives;
at least one channel control section having a plurality of ports that are connectable to at least one information processing device via cables, and that receives data input/output requests from the least one information processing device to the plurality of hard disk drives; and
at least one disk control section that is communicatably connected to the plurality of hard disk drives and that sends data input/output requests to the plurality of hard disk drives based on the data input/output requests to the plurality of hard disk drives that are received by the at least one channel control section,
wherein a status of each of the ports provided in the channel control section is displayed on a management terminal connected to the disk array device,
wherein the number of ports in use is compared to the number of ports available for use, and
wherein when the number of ports in use is less than the number of ports available for use, the at least one channel control section responds to a connection request received from the at least one information processing device, and when the number of ports in use is equal to the number of ports available for use, the at least one channel control section does not respond to the connection request.

14. A disk array device according to claim 13, wherein the status of each of the ports provided in the channel control section is one of a first status indicating that the use of the port is permitted, a second status indicating that the use of the port is not permitted, and a third status indicating that a failure has occurred in the port.

15. A disk array device according to claim 14, wherein a link is cut by sending an Off-line Primitive Sequence (OLS) to a port assigned the second status indicating that the use of the port is not permitted.

16. A disk array device according to claim 13, wherein the status of each of the ports provided in the channel control section is set or changed by input through a management terminal connected to the disk array device.

17. A method for controlling a disk array device, the disk array device comprising a plurality of hard disk drives, at least one channel control section having a plurality of ports that are connectable to at least one information processing device via cables, and that receives data input/output requests from the least one information processing device to the plurality of hard disk drives, and at least one disk control section that is communicatably connected to the plurality of hard disk drives and that sends data input/output requests to the plurality of hard disk drives based on the data input/output requests to the plurality of hard disk drives that are received by the at least one channel control section, the method comprising the steps conducted by the at least one channel control section:
displaying a status of each of the ports provided in the channel control section on a management terminal connected to the disk array device;
comparing the number of ports in use to the number of ports available for use;
responding to a connection request received from the at least one information processing device when the number of ports in use is less than the number of ports available for use; and
not responding to the connection request when the number of ports in use is equal to the number of ports available for use.

18. A method of controlling a disk array device according to claim 17, wherein the status of each of the ports provided in the channel control section is one of a first status indicating that the use of the port is permitted, a second status indicating that the use of the port is not permitted, and a third status indicating that a failure has occurred in the port.

19. A method of controlling a disk array device according to claim 18, further comprising the step of:
sending an Off-line Primitive Sequence (OLS) to a port assigned the second status indicating that the use of the port is not permitted thereby cutting a link.

20. A method of controlling a disk array device according to claim 17, wherein the status of each of the ports provided in the channel control section is set or changed by input through a management terminal connected to the disk array device.

21. A disk array device comprising:
a plurality of hard disk drives;
at least one channel control section having a plurality of ports that are connectable to at least one information processing device via cables, and that receives data input/output requests from the least one information processing device to the plurality of hard disk drives; and
at least one disk control section that is communicatably connected to the plurality of hard disk drives and that sends data input/output requests to the plurality of hard disk drives based on the data input/output requests to the plurality of hard disk drives that are received by the at least one channel control section,
wherein a priority is set on each of the ports, and selection for use is made from the ports in order of the priorities,
wherein the number of ports in use is compared to the number of ports available for use, and
wherein when the number of ports in use is less than the number of ports available for use, the at least one channel control section responds to a connection request received from the at least one information processing device, and when the number of ports in use is equal to the number of ports available for use, the at least one channel control section does not respond to the connection request.

22. A disk array device according to claim 21, wherein a processor provided in each of the at least one channel control section selects for use from the ports in order of the priorities.

23. A method for controlling a disk array device, the disk array device comprising a plurality of hard disk drives, at least one channel control section having a plurality of ports that are connectable to at least one information processing device via cables, and that receives data input/output requests from the least one information processing device to the plurality of hard disk drives, and at least one disk control section that is communicatably connected to the plurality of hard disk drives and that sends data input/output requests to the plurality of hard disk drives based on the data input/output requests to the plurality of hard disk drives that are received by the at least one channel control section, wherein a priority is set on each of the ports, the method comprising the steps conducted by the at least one channel control section:

selecting for use from the ports in order of the priorities;

comparing the number of ports in use to the number of ports available for use;

responding to a connection request received from the at least one information processing device when the number of ports in use is less than the number of ports available for use; and not responding to the connection request when the number of ports in use is equal to the number of ports available for use.

24. A method of controlling a disk array device according to claim 23, wherein a processor provided in each of the at least one channel control section selects for use from the ports in order of the priorities.

* * * * *